(12) United States Patent
Vogt

(10) Patent No.: US 12,248,809 B2
(45) Date of Patent: Mar. 11, 2025

(54) METHOD FOR DATA PROCESSING AND PROGRAMMABLE LOGIC CONTROLLER

(71) Applicant: Beckhoff Automation GmbH, Verl (DE)

(72) Inventor: Robin Vogt, Borchen (DE)

(73) Assignee: Beckhoff Automation GmbH, Verl (DE)

( * ) Notice: Subject to any disclaimer, the term of this patent is extended or adjusted under 35 U.S.C. 154(b) by 565 days.

(21) Appl. No.: 17/206,734

(22) Filed: Mar. 19, 2021

(65) Prior Publication Data

US 2021/0208561 A1  Jul. 8, 2021

Related U.S. Application Data

(63) Continuation of application No. PCT/EP2019/077497, filed on Oct. 10, 2019.

(30) Foreign Application Priority Data

Oct. 10, 2018 (DE) ..................... 10 2018 125 090.8

(51) Int. Cl.
*G06F 9/48* (2006.01)
*G05B 19/05* (2006.01)
*G06F 9/50* (2006.01)

(52) U.S. Cl.
CPC ......... *G06F 9/4881* (2013.01); *G05B 19/054* (2013.01); *G05B 19/056* (2013.01);
(Continued)

(58) Field of Classification Search
CPC ........ G06F 9/50; G06F 9/5027; G06F 9/5038; G06F 9/5066; G06F 2209/483;
(Continued)

(56) References Cited

U.S. PATENT DOCUMENTS 6,260,058 B1   7/2001   Hoenninger et al.
7,207,045 B2   4/2007   Goiffon
(Continued)

FOREIGN PATENT DOCUMENTS

DE       19500957 A1   1/1996
DE    102012216568      3/2017
(Continued)

OTHER PUBLICATIONS

Sandholm et al., "MapReduce Optimization Using Regulated Dynamic Prioritization", SIGMETRICS/Performance'09, Jun. 15-19, 2009 ACM, pp. 299-310 (Year: 2009).*

(Continued)

*Primary Examiner* — Charles M Swift
(74) *Attorney, Agent, or Firm* — Dorsey & Whitney LLP

(57) ABSTRACT

A method for data processing on a programmable logic controller (PLC) having a control task comprising a plurality of executable programs, where at least two programs of the control task each have at least one parallel processing section comprising a work package having a plurality of subtasks. The parallel processing sections in the respective programs are assigned predetermined priority levels, which are inserted into a data structure once execution has reached the parallel processing section. At least one parallel processor core checks whether there are entries in the data structure, and, if so, processes subtasks from the work package of the program the priority level at the top of the entries. An expected computational throughput of the control task is continuously evaluated, and at least one of the priority levels is dynamically adjusted if the computational throughput of the control task increases as a result.

18 Claims, 4 Drawing Sheets

(52) U.S. Cl.
CPC .............. *G06F 9/48* (2013.01); *G06F 9/4806* (2013.01); *G06F 9/4843* (2013.01); *G06F 9/50* (2013.01); *G06F 9/5027* (2013.01); *G06F 2209/483* (2013.01); *G06F 2209/5021* (2013.01)

(58) Field of Classification Search
CPC .. G06F 2209/5021; G06F 9/48; G06F 9/4806; G06F 9/4831; G06F 9/4843; G06F 9/4881
See application file for complete search history.

(56) References Cited

U.S. PATENT DOCUMENTS

| | | | |
|---|---|---|---|
| 8,898,435 B2 * | 11/2014 | Merchant | G06F 11/3466 712/205 |
| 9,195,575 B2 | 11/2015 | Kaku et al. | |
| 9,411,641 B2 | 8/2016 | Dickson | |
| 9,412,158 B2 | 8/2016 | Davis et al. | |
| 9,645,853 B2 | 5/2017 | Dickson | |
| 9,904,576 B2 | 2/2018 | Dickson | |
| 2001/0039575 A1 * | 11/2001 | Freund | G06F 9/465 709/223 |
| 2009/0025004 A1 * | 1/2009 | Barnard | G06F 9/50 718/104 |
| 2010/0262742 A1 * | 10/2010 | Wolfe | G06F 13/26 710/265 |
| 2011/0246998 A1 | 10/2011 | Vaidya et al. | |
| 2013/0074088 A1 * | 3/2013 | Purcell | G06F 9/461 718/103 |
| 2015/0106819 A1 * | 4/2015 | Kim | G06F 9/5038 718/103 |
| 2015/0135183 A1 | 5/2015 | Kipp | |
| 2016/0124770 A1 | 5/2016 | Bouchard et al. | |
| 2020/0326980 A1 * | 10/2020 | Prantner | G06F 9/5038 |

FOREIGN PATENT DOCUMENTS

| | | |
|---|---|---|
| EP | 0935194 A2 | 8/1999 |
| EP | 2997469 A1 | 3/2016 |
| WO | 2012051972 A2 | 4/2012 |
| WO | 2014055961 A2 | 4/2014 |

OTHER PUBLICATIONS

Pyka et al. "Konzepte zur Parallelisierung von Steuerungsaufgaben und Vision-Anwendungen auf Einer Many-Core Plattform", Beckhoff Automation GmbH, 29 pages with English translation.

Mohanty et al. "Priority Based Dynamic Round Robin (PBDRR) Algorithm with Intelligent Time Slice for Soft Real Time Systems," IJACSA, vol. 2, No. 2, Feb. 2011, 5 pages.

International Preliminary Report on Patentability dated Jan. 20, 2021 in connection with International Patent Application No. PCT/EP2019/077497, 39 pages including English translation.

Rajput et al. "A Priority based Round Robin CPU Scheduling Algorithm for Real Time Systems," IJIET, vol. 1, Iss. 3, Oct. 2012, 11 pages.

International Search Report and Written Opinion dated Dec. 17, 2019 in connection with International Patent Application No. PCT/EP2019/077497, 40 pages including English translation.

Office Action dated Sep. 9, 2019 in connection with German patent application No. 102018125090.8, 13 pages including English translation.

Office Action dated Oct. 27, 2023 in connection with Chinese patent application No. 201980066138.2, 17 pages including English translation.

"Speicherprogrammierbare Steuerung," Wikipedia (Sep. 19, 2018), 26 pages including English translation.

Summons to oral proceedings dated Feb. 7, 2022 in connection with European patent application No. 19786777.3, 20 pages including English translation.

Srivastava et al. "Topics in Parallel and Distributed Computing: Introducing Algorithms, Programming, and Performance within Undergraduate Curricula, Chapter 11—Scheduling in Parallel and Distributed Computing Systems," University of Southern Indiana.

Summons dated Jan. 24, 2025 in connection with European patent application No. 19786777.3, 20 pages including English translation.

* cited by examiner

METHOD FOR DATA PROCESSING AND PROGRAMMABLE LOGIC CONTROLLER

CROSS-REFERENCE TO RELATED APPLICATIONS

This application claims priority to International Application PCT/EP2019/077497, filed Oct. 10, 2019, entitled METHOD FOR DATA PROCESSING AND PROGRAMMABLE LOGIC CONTROLLER, and German Patent Application DE 10 2018 125 090.8, filed Oct. 10, 2018, entitled VERFAHREN ZUR DATENVERARBEITUNG UND SPEICHERPROGRAMMIERBARE STEUERUNG, each of which is incorporated by reference herein, in the entirety and for all purposes.

FIELD

The present invention relates to a method for processing data on a programmable logic controller (PLC). The invention further relates to a programmable logic controller which is used in particular for regulating or controlling a machine or a system.

BACKGROUND

Machines or systems of an automation system are often controlled by programmable logic controllers (PLC). The PLC controls or regulates the actuators and sensors of the machine or system via a communication interface. This may e.g. be implemented as a Fieldbus system, wherein the actuators and sensors of the machine or system may be networked via the Fieldbus system.

By reading out the measured data of the sensors and/or the current actual data of the actuators connected to the inputs of the programmable logic controller, the PLC receives information on the status of the machine or the system. The actuators are connected to the outputs of the programmable logic controller and enable the control of the machine or of the system. For dynamic addressing of the actuators, the PLC generates the output data for the actuators on the basis of the actual data and/or on the basis of the measured data of the sensors, wherein said data may be individual values or groups of values. Likewise, the actuators can be controlled on the basis of specifications, e.g. on the basis of movement profiles. In order to be able to provide the desired mode of operation of the machine or of the system, the control task of the PLC determines which output data generated by the PLC on the basis of corresponding input data are supplied to the actuators. The processing of the data by the PLC usually takes place cyclically and comprises three steps: providing of current input data (e.g. actual data from the actuators and/or measurement data from the sensors), processing the input data into output data, and outputting the output data for motion control (e.g. target positions, etc.).

For the control of the automation system it is mandatory that the processing of the input data is finished at the latest at the point in time when the output data for the actuators are required. This point in time is referred to as the deadline and usually corresponds to the end of a program cycle of the PLC. A demand on programmable logic controllers is usually a hard real-time capability, which means that deadlines have to be consistently met and never be exceeded. In addition, a valid result for the actuators should be available at the time of the deadline. This is particularly relevant if exceeding the deadline may lead to personal injury or damage to property, e.g. if a robot arm is not stopped in time.

The program execution of the PLC is e.g. defined in the IEC 61131-3 standard. The PLC has a control task and this is usually composed of one or more programs with tasks which in general are to be executed cyclically. In the simplest case, the programmable logic controller has only one single processor core for several independent programs including tasks. Therefore, the available computing time should be divided in such a way that all programs with corresponding tasks can meet their deadlines. Depending on the application, the different program cycle times in the PLC may e.g. be in a range of 100 µs to 20 ms or, in case of complex tasks, in a range of 50 ms to 100 ms. Due to the different program cycle times, it is important to prevent programs with tasks having longer cycle times from delaying the start of programs with tasks having shorter cycle times so that they can no longer meet their deadlines. Often this can only be achieved if the execution of such a slow program is interrupted and continued later.

For this reason, each program with corresponding tasks is usually assigned a predefined priority level. This may be determined on the basis of the deadline and/or the dependencies of the respective programs on the other programs, e.g. if the programs depend on the results of the other programs. The priority level may further correspond to an integer value.

Since many PLCs comprise processors with a plurality of processor cores and/or a plurality of processors, the PLC can divide programs with corresponding tasks among a plurality of processor cores or processors in order to reduce the total processing time of the programs with the corresponding tasks by at least partially executing the corresponding tasks in parallel. Thereby, a so-called computational throughput of the control task may result from a temporal interruption duration of the programs, a number of interruptions of the programs, or a computational time of the respective programs. Furthermore, the computational throughput of the control task may depend on a capacity utilization of the processor cores. If the programs and tasks are divided among a plurality of processor cores, it may happen due to the assigned priority levels that tasks currently being executed in parallel are interrupted by other tasks associated with a higher priority level in the corresponding program on the processor cores working in parallel. Interruptions of tasks increase the so-called administrative overhead and may vary in time. The administrative overhead includes the activities required when interrupting the processing of tasks in the programs. The activities may e.g. be transmitting and saving intermediate results of the interrupted tasks—otherwise the tasks of the programs may need to be processed again from the beginning. Consequently, the computational throughput may decrease if the administrative overhead is high, since usually no calculations are performed while the programs are interrupted. Similarly, the computing time of the programs may have an influence on the computing throughput, since programs with a short program cycle time may, if necessary, be executed faster in a purely sequential manner without parallelization than on the processor cores operating in parallel. This is because the programs on the processor cores working in parallel may under certain circumstances be interrupted by other programs with higher priority, which may increase the total execution time of the programs. If the processor cores are not fully utilized, e.g., by executing the programs sequentially instead of in parallel by the processor cores provided for this purpose, it is possible that the computing power of the processor cores provided for parallelization is not fully utilized. This may also reduce the computational throughput of the control task.

SUMMARY

The present invention provides a method for optimizing data processing that makes the best possible use of available resources. The invention further provides an improved programmable logic controller.

EXAMPLES

According to an aspect, a method for optimizing data processing on a programmable logic controller (PLC) is proposed. The PLC comprises at least one parallel processor core. The PLC further comprising a control task comprising a plurality of executable programs. At least two programs of the control task each have at least one parallel processing section comprising a work package, the work package comprising a plurality of subtasks. The parallel processing sections in the respective programs are assigned a priority with a predetermined priority level, and the respective priority levels are inserted into a data structure once an execution of the program arrives at the parallel processing section. The at least one parallel processor core verifies whether entries are present in the data structure and, if entries are present, the at least one parallel processor core processes subtasks from the work package of the program, the priority level of which is at the top of the entries in the data structure. During a program cycle, an expected computational throughput of the control task is continuously evaluated and at least one of the priority levels of the parallel processing sections of the respective programs is dynamically adjusted if the computational throughput of the control task increases as a result.

According to a further aspect, a programmable logic controller (PLC) is proposed. The PLC comprises a communication interface for reading sensor data and for outputting actuator data. Further, the PLC comprises data processing unit comprising at least one parallel processor core for executing a control task to generate actuator data from the sensor data, as well as a control device comprising a data structure memory for storing a data structure having priority levels and a priority manager for managing the priority levels in the data structure. The control device includes an intermediate result memory in which intermediate results of calculations are saved. The control task further comprises a plurality of executable programs, wherein at least two programs of the control task each comprise at least one parallel processing section comprising a work package, and the work package comprises a plurality of subtasks. The parallel processing sections in the respective programs are assigned a priority with the predetermined priority level. The priority manager is embodied to insert the respective priority levels into the data structure in the data structure memory as soon as an execution of the program arrives at the parallel processing section, thereby placing the entry with the highest priority level at the first position of the entries in the data structure. The at least one parallel processor core is embodied to check the data structure in the data structure memory for entries of the priority levels and, if entries are present, to process subtasks from the work package of the corresponding program, the priority level of which is at the first position of the entries in the data structure. The control device is embodied to continuously evaluate an expected computational throughput of the control task during a program cycle. Furthermore, the priority manager is embodied to dynamically adjust at least one of the priority levels of the parallel processing sections of the respective programs if the computing throughput of the control task increases as a result.

According to another aspect, an automation system is proposed. The automation system comprising: a machine with at least one sensor and actuator, and a programmable logic controller.

The programmable logic controller comprises at least one parallel processor core for executing a control task to generate actuator data from sensor data of the machine. The control task includes a plurality of executable programs. At least two programs of the control task each have at least one parallel processing section with a work package, and the work package comprises a plurality of subtasks. The parallel processing sections in the respective programs are assigned a priority with the predetermined priority level. The respective priority levels are inserted into a data structure once an execution of the program has arrived at the parallel processing section. The at least one parallel processor core checks whether entries are present in the data structure and wherein, if entries are present, subtasks from the work package of the program the priority level of which is in the first position of the entries in the data structure are processed by the at least one parallel processor core. During a program cycle an expected computational throughput of the control task is continuously evaluated, and wherein at least one of the priority levels of the parallel processing sections of the respective programs is dynamically adjusted if the computational throughput of the control task is increased thereby.

BRIEF DESCRIPTION OF THE DRAWINGS

The above-described features, characteristics and advantages of the present invention as well as the manner in which they are achieved will become clearer and more clearly understood in connection with the following description of embodiments, which will be explained in more detail in conjunction with the schematic drawings, which show.

DETAILED DESCRIPTION

Figure 1:
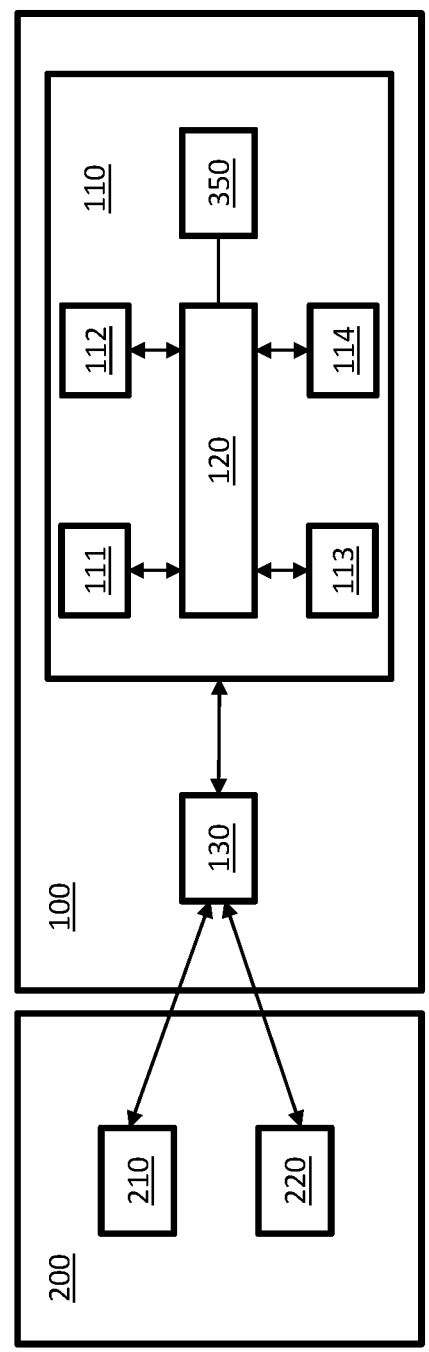
FIG. 1 a schematic depiction of a proposed automation system with a programmable logic controller (PLC)

The following figures describe an example of a method for optimizing data processing on a programmable logic controller (PLC). It should be noted that the figures are merely schematic in nature and not to scale. Thereby, components and parts shown in the figures may be shown excessively large or reduced in size for better understanding. Furthermore, it is pointed out that the reference signs in the figures remain unchanged if they refer to identically embodied parts and/or components and/or sizes.

Programmable logic controllers (PLCs) often form the basis of an automation system and serve to control or actuate a system or a machine. The PLC or the system or machine is controlled via sensors and actuators. The sensors and actuators may be networked with the machine or the system via a communication interface, wherein the PLC uses this communication interface to interact with the sensors and actuators. PLC data processing is usually cyclic and requires the PLC, or more specifically the control task, to consistently meet deadlines. In this context, it should not happen, for example, that at the time when the output data for the actuators are required, the processing of the input data has not yet been completed. The control task should therefore be able to guarantee the real-time capability of the automation system.

Usually the control task of the PLC is composed of one or more programs with tasks to be executed cyclically, the "tasks". Since many PLCs comprise processors with a plurality of processor cores, which may e.g. be realized as main and parallel processor cores, and/or a plurality of processors, the PLC may divide up the programs comprising tasks among a plurality of processor cores and/or a plurality of processors in order to reduce the total processing time of the programs comprising tasks and to ensure that the deadlines of the programs are met. If the tasks of the programs are processed by a plurality of processor cores (main processor cores and parallel processor cores) in parallel, it is suitable to be able to classify the tasks of the programs for the processing of a given priority level accordingly. For this reason, each program with corresponding tasks is usually assigned a predefined priority level. This may be determined from the deadline and/or from the dependencies of the respective programs on the other programs, if the programs e.g. depend on the results of the other programs.

The priority level of the corresponding program comprising tasks is organized by a priority manager in a data structure. The priority manager stores the entry of the priority level in the data structure. If there is no further entry of a priority level in the data structure, the priority manager places said priority level to the first position in the data structure. The priority manager may be further embodied to notify the parallel processor cores if the order of the entries of the priority levels in the data structure changes. For example, the order may change when a new priority level entry is added to the data structure, in which case the priority level may have a higher value than the priority level of the previous entry. In such a case, the parallel processor cores may interrupt the processing of the current tasks of the corresponding program and start processing the tasks corresponding to a higher priority level of the corresponding program in order to meet its deadlines. The tasks of a corresponding program may be divided into a plurality of work packages comprising subtasks.

During a program cycle, an expected computational throughput of the control task is continuously evaluated. Based on this evaluation, it may be decided that at least one of the priority levels of the parallel processing section of the respective program of the control task is dynamically adjusted if the computational throughput of the control task is increased by adjusting the value of the at least one priority level of the parallel processing section. The expected computational throughput of the control task depends on a number of interruptions of the parallel processing sections of the programs, since the number of interruptions of the parallel processing sections of the programs results in an administrative overhead. The administrative overhead describes the activities that are required when interrupting the processing of the subtasks in the parallel processing sections in the programs of the control task, such as transferring and saving intermediate results. Frequent interruptions of the processing of the parallel processing sections accordingly lead to a higher administration overhead. The temporal interruption duration of the programs is also relevant for the computing throughput, since during the temporal duration of the interruption of the processing of the subtasks of the parallel processing sections of the programs no computations are accomplished, but the above-described activities are executed. Accordingly, the temporal interruption duration extends the execution time of the program since it has an additive effect on the actual computation time of the program, and this is usually predetermined. In addition, the interruption duration may vary in time when the calculations of the programs with parallel processing sections are interrupted. Thus, the goal is to keep the administrative overhead as low as possible and to dynamically adjust the value of the at least one priority level in order to reduce the frequency of the interruptions of the program computations and thus to increase the computational throughput.

Furthermore, the expected computational throughput of the control task depends on the used computational power of the at least one parallel processor core. If the programs are carried out purely sequentially on the corresponding main processor cores, for example by having been assigned the minimum value of the at least one priority level of the parallel processing sections of the programs, it may occur that the at least one parallel processor core is not performing any active calculations at the moment or is active only to a limited extent. This reduces the computational throughput of the control task since the computational power of the at least one parallel processor core is not or not fully utilized. In such a case, the value of the at least one priority level of the parallel processing sections of the programs may be adjusted, e.g. increased, so that the programs are executed in parallel on the at least one parallel processor core and the computing power of the available processor cores is used in the best possible way.

Furthermore, the computing time of the parallel processing sections of the programs may be taken into account when evaluating the expected computing throughput of the control task. This is because programs with subtasks having a short program cycle time may, if necessary, be executed faster purely sequentially without parallelization than in the respective parallel processing section in the program. The parallel processing section of the respective program may be interrupted for another parallel processing section of another program with a higher assigned priority level. Since the interruptions of the parallel processing section may be triggered as often as desired by other programs with parallel processing sections, it can happen under certain circumstances that the total execution time of the program interrupted by other parallel processing sections of further programs is longer than without parallelization. In such a case it is therefore conceivable to execute the program comprising subtasks purely sequentially in order to achieve a shorter execution time of the corresponding program in this manner and to increase the computing throughput.

The core of the proposed method, programmable logic controller and automation system lies in the possibility of dynamically adjusting the value of the at least one priority level of the parallel processing section of the respective program of the control task. This is because the dynamic adaptation of the value of the at least one priority level of the parallel processing section of the respective program allows for deciding flexibly whether the subtasks of the respective program are to be processed sequentially on the assigned main processor core or additionally on the at least one parallel processor core in the respective parallel processing section of the program. In this way, optimum capacity utilization of the resources may be provided by the main processor cores and the parallel processor cores jointly processing subtasks of the respective program. The real-time capability of the control task may be further guaranteed by adjusting the value of the priority level of the parallel processing section of the corresponding program of the control task, in that the adjustment of the value of the priority level is always performed in such a way that the real-time condition of the control task and the deadlines of the programs can be met.

A method for optimizing data processing on a programmable logic controller (PLC) is proposed. The PLC comprises at least one parallel processor core. The PLC further comprising a control task comprising a plurality of executable programs. At least two programs of the control task each have at least one parallel processing section comprising a work package, the work package comprising a plurality of subtasks. The parallel processing sections in the respective programs are assigned a priority with a predetermined priority level, and the respective priority levels are inserted into a data structure once an execution of the program arrives at the parallel processing section. The at least one parallel processor core verifies whether entries are present in the data structure and, if entries are present, the at least one parallel processor core processes subtasks from the work package of the program, the priority level of which is at the top of the entries in the data structure. During a program cycle, an expected computational throughput of the control task is continuously evaluated and at least one of the priority levels of the parallel processing sections of the respective programs is dynamically adjusted if the computational throughput of the control task increases as a result.

A parallel processor core is a processor core of the PLC that is intended for the parallel processing of subtasks. In addition, the PLC may have further processor cores which are referred to as main processor cores. The main processor cores may each execute one or a plurality of programs of the control task. The plurality of programs of the control task may have programs that are executed in a purely sequential manner, wherein at least two programs of the control task comprise at least one parallel processing section. These parallel processing sections of the programs may be executed with the assistance of the parallel processor cores.

The computational throughput of the control task may be evaluated via the temporal interruption duration and the number of interruptions of the parallel processing sections of the programs. This is because during the interruption period of the processing of the subtasks of the parallel processing sections of the programs, no calculations are performed, but intermediate results are transferred and saved, and the entries of the priority levels into the data structure are resorted, the at least one parallel processor core first requests free subtasks for processing before processing the subtasks of the work package of a further program with a parallel processing section or first accesses the intermediate result memory when resuming the processing of the interrupted subtasks in order to be able to use the already calculated intermediate results as a starting point for the further processing of the interrupted subtasks. In this respect, the temporal interruption duration, as well as the number of interruptions of the programs with parallel processing sections, affect the computational throughput of the control task, since they increase the total execution time of the programs. Accordingly, a maximum computational throughput of the control task could be achieved without interruptions of the programs with parallel processing sections.

The number of interruptions of the programs with parallel processing sections may be reduced by the dynamic adaptation of the value of the at least one priority level of the parallel processing section of the programs, since the value of the at least one priority level can be specifically adapted to the respective situation in order to reduce the management effort of the control task. If subtasks of a work package are currently being executed in parallel and are interrupted by other subtasks of another work package with a higher priority level of the corresponding parallel processing section of the respective program, the value of the at least one priority level of the subtasks may be changed directly within the program cycle to avoid further interruption of the subtasks of the corresponding parallel processing sections and additional administrative effort. The adjustment of the value of the at least one priority level may also be carried out for a new program cycle in which the respective program is executed again from the beginning.

In order to not reduce the value of the at least one priority level for each program cycle, an additional condition, for example in that the value of the at least one priority level for the new program cycle be at least half the value of the specified at least one priority level, may be used to ensure that the value of the at least one priority level of the programs is not unintentionally set to a minimum value. This is because the minimum value of the at least one priority level of the parallel processing section of the programs means that the respective program is executed sequentially on the corresponding main processor core. In this way, the computing power of the at least one parallel processor core may not be fully utilized, wherein the unused computing power reduces the computing throughput of the control task. Accordingly, capacity utilization of the processor cores may advantageously be taken into account via said additional condition of the lower limit for adjusting the value of the at least one priority level of the parallel processing section of the programs.

Furthermore, the computing throughput of the control task may be evaluated by the computing time of the parallel processing sections. Programs with subtasks that have a short program cycle time, for example 1 ms, may certainly be distributed in the parallel processing section of the program to the at least one parallel processor core for parallel processing of the subtasks. As the case may be, however, this can result in the parallel processing section of the program with the respective subtasks being interrupted for another parallel processing section with a higher priority level. In the explained example, the parallelization of the program with a short program cycle time may lead to an increase in the administrative overhead, and the computing time for the parallel processing section may increase as a result. The total execution time of the program may be slower due to the parallelization than for the case in which the program is executed purely sequentially and without interruption. Since the sequential computing time of the program with short program cycle time may be shorter than the computing time of the parallel processing section, it is advantageous to consider the respective computing time required for the execution of the program when evaluating the computing throughput (in addition to the time duration and the number of interruptions of the parallel processing sections as well as the capacity utilization of the processor cores) in order to improve the computing throughput of the control task.

The dynamic adaptation of the value of the at least one priority level of the parallel processing section of the programs is carried out during the program runtime if the computational throughput of the control task can be increased thereby. Without dynamic adaptation of the value of the at least one priority level of the parallel processing section in the corresponding programs, it may otherwise happen that the total execution time of the respective programs increases due to the interruption time and the associated additional management effort and the programs of the control task are slower overall than for the case in which the tasks of the programs are processed purely sequentially without interruption in the assigned programs.

In addition to the dynamic adaptation of the value of the at least one priority level of the parallel processing section of the programs during the program runtime, it is further conceivable to determine the best possible value of the at least one priority level of the parallel processing sections of the programs by a simulation before the program start of the control task of the PLC. The optimum value of the at least one priority level of the parallel processing sections of the programs obtained in this way may be used as a starting value for program execution if a plurality of programs of the control task of the PLC share a main processor core or also in case that only one program is executed on a main processor core, respectively.

Furthermore, the adaptation of the at least one priority level of the parallel processing sections of the respective programs takes place during an interruption of the processing of the subtasks of the program. The computational throughput of the control task depends on the temporal interruption duration when processing the subtasks, since during this time no subtasks of the parallel processing sections of the programs are processed, but intermediate results of the calculations of the subtasks are transferred and saved if necessary. In addition, each interruption may differ in time. Consequently, the interruption duration may increase the total execution time of the programs, since the temporal interruption duration should be considered in addition to the calculation time of the programs. It is also evident that frequent interruptions in the execution of the subtasks of the parallel processing sections lead to a decrease in the computational throughput, since the frequent interruptions in the computations also increases the administrative overhead due to the increased transfer and saving of the intermediate results of the calculations of the subtasks. Therefore, the number and duration of the interruptions should be kept as low as possible in order to be able to achieve a high computational throughput of the control task in this way. This may be implemented by the dynamic adjustment of at least one priority level of the parallel processing sections of the programs during the interruption of the processing of the subtasks of the parallel processing sections of the programs.

Additionally, the adjustment of the at least one priority level of the parallel processing sections of the respective programs occurs when the subtasks of the program are interrupted due to other subtasks of a further program having a higher priority level of the parallel processing section on the at least one parallel processor core. If the subtasks of a work package are interrupted due to other subtasks of a further work package associated with a higher value of the priority level of the parallel processing section in the associated program on the at least one parallel processor core, the value of the at least one priority level of the interrupted subtasks may be changed directly within the program cycle in order to generate as little administrative effort as possible for the outstanding subtasks.

Furthermore, it is also possible to adjust the value of the at least one priority level of the interrupted subtasks of the parallel processing section of the respective program for the next program cycle accordingly, as already described above. Also, with the above-mentioned additional condition for the start value of the at least one priority level, it may be ensured for the next program cycle that the value of the at least one priority stage does not unintentionally drop below a lower limit.

The computational throughput of the control task results from the duration and the number of interruptions of the programs with tasks, i.e. the administrative overhead. The computational throughput may be increased by reducing the administrative overhead, i.e. by reducing the number of interruptions of the programs. Further it is possible to increase the computing throughput by taking the computing time of the respective programs into account. If a program with subtasks with short program cycle time may be executed faster in a purely sequential manner, i.e. with a shorter sequential computing time without interruption than is possible with interruptions in the parallel processing section of the program, as the case may be, then the computing throughput of the control task may also be increased by considering of the appropriate computing time in the program. Also, the computational throughput of the control task may be increased by fully utilizing the computational power of the at least one parallel processor core and by ensuring that subtasks of the parallel processing section of the respective program which are to be processed in parallel are processed by the at least one parallel processor core, wherein programs to be executed sequentially are executed on the respective main processor core. Increased computational throughput may further contribute to reducing the overall execution time of the programs and subtasks, since the control task is given more computational time in this way.

Besides, the adaptation of the at least one priority level of the parallel processing sections of the respective programs takes into account an additional condition, in particular a real-time condition of the control task. The dynamic adaptation of the value of the at least one priority level of the parallel processing section of the respective programs during the program runtime may further guarantee a real-time capability of the automation system. The deadlines of the programs may in any case be met by adjusting the value of the priority level. For adjusting the at least one priority level of the parallel processing sections of the programs, in addition to the real-time condition, the above-mentioned possible condition of the lower limit for the value of the at least one priority level may be taken into account, as well.

Furthermore, the at least one priority level of the parallel processing sections of the respective programs is reduced by a factor if the subtasks of the program are interrupted due to other subtasks of another program having a higher priority level of the parallel processing section on the at least one parallel processor core. Reducing the value of the at least one priority level of the parallel processing sections of the respective programs by a factor may help to reduce administrative overhead. This is because the value of the at least one priority level of the respective parallel processing section in the respective program associated with the subtasks that have been interrupted may be reduced to prevent further interruption of the parallel processing sections comprising the subtasks directly within the program cycle. In addition, during the interruption of the calculations of the subtasks in the parallel processing sections of the programs, it may happen that current intermediate results be transferred and data saved. Frequent interruptions of the subtasks can therefore generate an enormous amount of work, which should be minimized. The adjustment of the value of the at least one priority level of the parallel processing section of the respective program is always carried out under the condition that the real-time capability of the automation system can be guaranteed, i.e. that the processing of the input data be completed at the latest at the point in time when the output data for the actuators are required. Consequently, it should be possible to guarantee that the deadlines of the programs may still be met in spite of a reduction in the value of at least one priority level of the parallel processing sections of the corresponding programs.

Furthermore, the value of the at least one priority level of the parallel processing section of the program of the interrupted subtasks may be increased immediately after the interruption of the processing of the subtasks. Increasing the value of the at least one priority level of the parallel processing section of the programs may help to ensure that the associated subtasks are no longer interrupted by the other parallel processing section of the further program. In addition to the dynamic adjustment of the value of the at least one priority level of the interrupted subtasks of the parallel processing sections of the programs, it is further conceivable to adjust the value of the priority level of the program that has caused the interruption of the processing of the subtasks of the parallel processing section of the other program. In this way, it can be prevented that the currently processed subtasks of the parallel processing section of the one program are not interrupted again by the other parallel processing section of the other program.

As an alternative to reducing the duration and the number of interruptions of the parallel processing section in the respective program by adjusting the value of the at least one priority level of the parallel processing section, it is also conceivable to take the computing time of the parallel processing section of the respective program into account when evaluating the computing throughput. That is, it may be decided individually whether the value of the at least one priority level of the parallel processing section of the respective program is to be adapted and/or the subtasks of the program are to be processed purely sequentially, as the case may be, if the sequential computing time for the subtasks of the respective program is shorter than the computing time of the parallel processing section of the respective program. This similarly applies to the subsequent embodiments, therefore this alternative possibility is no longer repeated for the subsequent embodiments.

Additionally, the at least one priority level of the parallel processing sections of the respective programs is set to a minimum value if the subtasks of the programs may be executed sequentially in the respective programs. In an extreme case, it is possible to set the value of the at least one priority level of the parallel processing sections of the plurality of programs of the control task to a minimum value. This embodiment is particularly conceivable if the subtasks do not require mandatory parallel execution, but may also be sequentially processed in the assigned program.

Besides, the at least one priority level of the parallel processing sections of the respective programs is reset to the specified value at the start of a new program cycle. An advantage of adjusting the value of the priority level of the parallel processing sections of the respective programs is that this can be done temporarily. The dynamic adjustment of the value of the at least one priority level may take place directly within the program runtime and does not have to take place in the same way for the entire runtime of the program. The value of the priority level may e.g. be reset to the predetermined value for a new program cycle and may be changed again during the program cycle and/or for a further program cycle.

Furthermore, the at least one priority level of the parallel processing sections of the respective programs is increased at the beginning of a new program cycle if the subtasks were previously executed sequentially in the associated programs. Instead of reducing the value of the at least one priority level of the parallel processing sections of the respective programs, the value of the at least one priority level may also be increased. For example, the adjustment of the value of the at least one priority level may occur at the beginning of the new program cycle. This embodiment is conceivable if the subtasks with the corresponding priority level were processed purely sequentially in the associated program in a previous program cycle. With this embodiment, it can be avoided that too many programs of the control task at some point have a minimum value of the at least one priority level of the parallel processing section of the programs and the programs are executed purely sequentially. If the programs are executed purely sequentially on the main processor cores, this may have the consequence that the available computing power of the parallel processor cores is no longer fully utilized, which then results in a reduced overall computing throughput of the control task.

A programmable logic controller (PLC) is further proposed. The PLC comprises a communication interface for reading sensor data and for outputting actuator data. Further, the PLC comprises data processing unit comprising at least one parallel processor core for executing a control task to generate actuator data from the sensor data, as well as a control device comprising a data structure memory for storing a data structure having priority levels and a priority manager for managing the priority levels in the data structure. The control device includes an intermediate result memory in which intermediate results of calculations are saved. The control task further comprises a plurality of executable programs, wherein at least two programs of the control task each comprise at least one parallel processing section comprising a work package, and the work package comprises a plurality of subtasks. The parallel processing sections in the respective programs are assigned a priority with the predetermined priority level. The priority manager is embodied to insert the respective priority levels into the data structure in the data structure memory as soon as an execution of the program arrives at the parallel processing section, thereby placing the entry with the highest priority level at the first position of the entries in the data structure. The at least one parallel processor core is embodied to check the data structure in the data structure memory for entries of the priority levels and, if entries are present, to process subtasks from the work package of the corresponding program, the priority level of which is at the first position of the entries in the data structure. The control device is embodied to continuously evaluate an expected computational throughput of the control task during a program cycle. Furthermore, the priority manager is embodied to dynamically adjust at least one of the priority levels of the parallel processing sections of the respective programs if the computing throughput of the control task increases as a result.

Programmable logic controllers often form the basis of an automation system and currently have complex computing and control functions that require powerful hardware and efficient software to implement. The high computing power may thereby be based on the simultaneous use of a plurality of processor cores in order to operate the system efficiently and to make the best use of the available resources. The PLC designed in this way allows the deadlines of the programs to be met and may further grant real-time data processing. The method for optimizing the data processing on a PLC may represent such an efficient software for the PLC in order to make the best possible use of the computing power of the available processor cores in which the programs of the control task may be executed distributed over a plurality of processor cores. If the programs are executed in parallel on the at least one parallel processor core, it may happen due to the priority levels assigned to the respective parallel processing sections of the programs that the programs are interrupted by other programs with a higher priority level of the parallel processing section. Interruptions of the programs of the control task of the PLC are usually not desired, since they reduce the computational throughput of the control task. They also increase the total execution time of the programs, since the interruption time of the programs has an additive effect on the pure computation time of the programs. In this respect, it is convenient to be able to adjust the value of the at least one priority level of the parallel processing section of the program by the priority manager of the control device of the PLC dynamically during the program cycle in case of an interruption of the program with the parallel processing section. In doing so, the control device of the PLC is used to determine and evaluate the expected computational throughput of the control task. The control device may further trigger the priority manager of the PLC to adjust the value of the at least one priority level of the parallel processing section of the respective program, if the computing throughput is in this way increased by the possible adjustment of the value of the at least one priority level of the parallel processing sections of the programs. As the case may be, the control device of the PLC may decide in case of a short program cycle time that the subtasks of the program are to be executed purely sequentially, instead of in the parallel processing section of the program, which may involve interruptions in the computations of the subtasks. Otherwise, it may be possible that the total execution time of the program is slower due to the parallelization than for the case in which the subtasks of the program are processed sequentially without interruption.

In addition, the control device may take into account the capacity utilization of the computing power of the at least one parallel processor core when evaluating the computing throughput and ensure that programs to be executed in parallel that are not to be executed sequentially on the respective main processor core are executed by the at least one parallel processor core. For this purpose, the control device of the PLC informs the priority manager that the value of the at least one priority level of the parallel processing sections of the programs is to be adjusted accordingly, for example to increase it if it was minimal before.

The programmable logic controller with the method for optimizing a data processing may be used flexibly and universally for various tasks of the automation system. For example, the PLC may generate data from the sensor data that may be relevant for quality assurance/control of the automation system. For example, if the sensor is implemented in the form of a camera, the quality of manufactured components may be evaluated by this camera. In this case, the PLC then does not generate actuator data as results, but evaluates the quality of the components e.g. as being faulty or as good. Furthermore, the PLC can be implemented with the method for optimizing data processing in a transport system in which it is necessary to be able to control and position transport elements on modular guide rails with motor modules. As the transport elements may be positioned individually, it is possible to parallelize the calculations for the transport elements and to execute them over a plurality of processor cores in a distributed manner. The PLC using the above-mentioned method may contribute to efficiently utilize the computing power of the processor cores, provide a high level of reliability for the positioning of the transport elements by the calculations and, due to the flexible use of the PLC, causes low costs in implementation.

Furthermore, the priority manager is embodied to adjust the at least one priority level of the parallel processing sections of the respective programs when the processing of the subtasks of the program is interrupted. The priority manager may adjust the value of the at least one priority level directly during the interruption of the processing of the subtasks of the program within the program cycle in order to prevent a further interruption of the program for the still outstanding subtasks. Similarly, the priority manager is able to adjust the value of the at least one priority level of the parallel processing section of the program for the next program cycle.

Additionally, the priority manager is embodied to adjust the at least one priority level of the parallel processing sections of the respective programs when the subtasks are interrupted due to other subtasks of another program having a higher priority level on the at least one parallel processor core. The priority manager may adjust the value of the at least one priority level of the parallel processing section of the respective program for the interrupted subtasks on the at least one parallel processor core in order to prevent further interruption of the subtasks on the at least one parallel processor core and, in this context, to provide for the least possible management overhead for the outstanding subtasks. This is because during each interruption of the subtasks, the intermediate results calculated by the at least one parallel processor core are transferred and saved to the intermediate result memory. In each interruption, the priority manager also reorders the entries of the priority levels in the data structure. Each time the interrupted subtasks are resumed, the at least one parallel processor core accesses the intermediate result memory again and use the saved intermediate results as a starting point for further processing of the subtasks. For this reason, the subtasks should be interrupted as infrequently as possible in order to generate a higher computational throughput of the control task and to reduce the total execution time of the programs and subtasks in this way.

Besides, the priority manager is embodied to take into account an additional condition, in particular a real-time condition of the control task, when adjusting the at least one priority level of the parallel processing sections of the respective programs. The priority manager provides for easy coordination and dynamic adjustment of the values of the entries of the priority levels in the data structure and the communication with the at least one parallel processor core. Furthermore, the priority manager may be used to ensure the real-time capability of the automation system since the priority manager adjusts the values of the priority levels of the respective parallel processing sections of the respective programs in such a way that the deadlines of the programs are met in any case. The priority manager adjusts the value of at least one priority level if the computational throughput of the control task increases as a result. In this context, the control device may continuously evaluate the computational throughput of the control task during a program cycle and trigger the priority manager to adjust the value of the at least one priority level of the parallel processing section in the respective program on the basis of the evaluation of the computational throughput.

Furthermore, the priority manager is embodied to reduce the value of the at least one priority level of the parallel processing sections of the respective programs by a factor if the subtasks of the program are interrupted on the at least one parallel processor core due to other subtasks of another program with a higher priority level. The priority manager may be configured to reduce the value of the at least one priority level of the parallel processing section of the respective program by a factor. For example, the value of the at least one priority level of the parallel processing section of the respective program may be reduced by half each time the subtasks of the corresponding program are interrupted directly during the program cycle. Alternatively, an adjustment of the value of the at least one priority level of the parallel processing section of the respective program by a lower factor is conceivable, as well. Furthermore, the adjustment of the value of the at least one priority level of the parallel processing section of the respective program may be carried out in a different manner for each program cycle. For example, the adjusted value of the at least one priority level of the parallel processing section of the respective program need not be maintained for each program cycle. The priority manager may carry out the adjustment of the value of the at least one priority level of the parallel processing section of the respective program after evaluating the computational throughput performed by the control device. As the control device continuously evaluates the computational throughput during a program cycle, the priority manager may dynamically adjust the value of the priority level within each program cycle and for each new program cycle.

Additionally, the priority manager is embodied to set the at least one priority level of the parallel processing sections of the respective programs to a minimum value if the subtasks of the programs are sequentially executable in the respective programs. The priority manager is capable of setting the value of the at least one priority level of the parallel processing section of the respective program to a minimum value. If the priority manager sets the value of the at least one priority level of the parallel processing section of the respective program to the lowest possible value, the associated subtasks are processed sequentially in the associated program. This is because the minimum value of the priority level means that the subtasks do not require mandatory parallel processing in order to be able to meet the deadlines of the programs, even if the at least one parallel processor core is not currently processing any other subtasks, but the subtasks may also be processed sequentially by the associated program. This embodiment is also conceivable in case of frequent interruptions of the calculations of the subtasks in the parallel processing sections, since the priority manager may reduce the value of the priority level of the parallel processing section of the program immediately to such an extent that the subtasks, after the interruption of the calculations on the at least one parallel processor core, are subsequently processed further in the associated program. In this way it is also possible to reduce the administrative overhead.

In the above mentioned example for the priority manager, the value of the at least one priority level of the parallel processing sections of the programs is deliberately set to the minimum value by the priority manager so that the subtasks of the programs are processed sequentially in the associated program, since they do not require mandatory parallelization. However, it may be possible that the value of the at least one priority level of the parallel processing sections of the programs was reduced by the priority manager directly after interruption of the processing of the subtasks of the parallel processing sections of the programs during the program cycle. Independently of this, in such a case a further reduction of the value of the at least one priority level of the parallel processing sections of the programs may be advantageous for a new program cycle if the processing of the subtasks of the parallel processing sections of the programs was interrupted in the previous program cycle. However, in order to not reduce the value of the at least one priority level for each program cycle, it may be ensured via an additional condition which may be implemented e.g. such that the value of the at least one priority level for the new program cycle is at least half the value of the predetermined at least one priority level, that the value of the at least one priority level of the programs is not unintentionally set to the minimum value.

Alternatively, the priority manager is embodied to reset the at least one priority level of the parallel processing sections of the respective programs to the predetermined value at the beginning of a new program cycle. As explained above, the priority manager may dynamically adjust the value of the at least one priority level of the parallel processing section of the respective program with each program cycle. Accordingly, in this context, it is possible for the priority manager to reset the value of the at least one priority level of the parallel processing section of the respective program to the predetermined value of the priority level for the new program cycle. The adjustment of the value of the at least one priority level of the parallel processing section of the respective program by the priority manager has the advantage that it is temporary and may be reversed.

Furthermore, the priority manager is adapted to increase the at least one priority level of the parallel processing sections of the respective programs at the beginning of a new program cycle if the subtasks of the programs were previously executed sequentially in the associated programs. The priority manager is likewise capable of increasing the value of the at least one priority level of the parallel processing section of the respective program of the control task, so that the associated subtasks may be processed prior to other subtasks of another work package and program on the at least one parallel processor core. This embodiment is conceivable if the subtasks have previously been processed sequentially in the associated program. With this embodiment, it may be prevented that too many programs of the control task at some point have a minimum value of the at least one priority level of the parallel processing section of the programs and the programs are executed purely sequentially. If the programs are executed purely sequentially on the main processor cores, this may have the consequence that the available computing power of the parallel processor cores is no longer fully utilized, which then results in a reduced overall computing throughput of the control task.

Additionally, the priority manager is embodied to modify the entry of the priority level in the data structure in the data structure memory in accordance with the adjustment made to the at least one priority level. Furthermore, the priority manager is embodied to inform the at least one parallel processor core of the change of the entry of the priority level in the data structure. On the one hand, the priority manager takes over the dynamic adaptation of the value of the at least one priority level of the corresponding parallel processing section of the respective program and, on the other hand, may further inform the at least one parallel processor core on the adaptation of the value of the at least one priority level in the data structure.

Besides, the priority manager is embodied to be executable in a distributed manner on a plurality of programs of the control task. For example, the priority manager that is part of the control device may comprise a plurality of modules (for example, software modules), wherein the individual modules (for example, software modules) of the priority manager may be executable in the plurality of programs of the control task. It is further conceivable that the priority manager comprises only a single central module (for example, a software module) that is executed in one of the plurality of programs of the control task. In addition, it is conceivable to realize the priority manager as a stand-alone program or as one or more external hardware modules.

The advantageous embodiments and further developments of the present invention described above and/or reproduced in the sub-claims may be used individually or in any combination with one another-except e.g. in cases of clear dependencies or incompatible alternatives.

FIG. 1 shows a programmable logic controller (PLC) 100 for controlling a machine or system 200. The PLC 100 has a communication interface 130 and a data processing device 110. Via the communication interface 130, which may e.g. be implemented in the form of a Fieldbus master of a Fieldbus system embodied as hardware and/or software, the PLC 100 may control the corresponding actuators 210 and sensors 220 of the machine or of the system 200 of the automation system, wherein the actuators 210 and sensors 220 may be networked by the Fieldbus system.

In order to be able to provide the desired mode of operation of the machine or of the system 200, the control task of the PLC 100 determines which output data generated by the PLC 100 are supplied to the actuators 210 depending on corresponding input data. The PLC 100 receives information on the state of the machine or of the system 200 by reading the measured data from the sensors 220 and/or the actual data from the actuators 210, which are correspondingly connected to the inputs of the PLC 100. The sensors 220 may generate an electrical signal to detect a measured value, or may record the measured value itself in analog or digital form. The actuators 210 are connected to the outputs of the PLC 100 and convert the electrical signals of the output data of the PLC 100 into mechanical motion or other physical quantities (for example, temperature, pressure, etc.).

The dynamic actuation of the actuators 210 may initially be based on reading the current actual data of the actuators 210. Based on the actual data of the actuators 210 and the measurement data of the sensors 220, the output data for the actuators 210 may be generated from the input data. Alternatively, the actuators 210 may be actuated based on specifications, e.g. based on motion profiles.

The data processing device 110 may comprise a plurality of processor cores, wherein FIG. 1 shows a first main processor core 111 and a second main processor core 112 as well as a first parallel processor core 113 and a second parallel processor core 114. Equally conceivable is an embodiment in which the data processing device 110 has a number of main processor cores and/or parallel processor cores differing therefrom. The advantage of the embodiment of the data processing device 110 comprising a first main processor core 111 and a second main processor core 112 as well as a first parallel processor core 113 and a second parallel processor core 114 is that the subtasks of the respective programs of the control task of the PLC 100 to be processed may be distributed to the two main processor cores 111, 112 and the two parallel processor cores 113, 114 according to the following description. This allows for reducing the computing time and also for ensuring optimum capacity utilization of the resources. The plurality of executable programs of the control task, at least two programs of which have a parallel processing section, may e.g. be executed on the first and second main processor cores 111, 112, wherein the first parallel processor core 113 and the second parallel processor core 114, as mentioned above, may assist in processing the subtasks in the respective parallel sections of the programs of the control task. The control task may e.g. comprise a program cycle executed within the PLC 100, the program cycle comprising receiving the input data (the measurement data from the sensors 220 and the current actual data from the actuators 210), processing the input data into output data for the actuators 210, and outputting the output data for the actuators 210. After processing has been completed, i.e. at the end of the program cycle, the program cycle of the control task starts again.

In contrast to the program cycle of the control task, a Fieldbus cycle further comprises, in addition to the above-mentioned steps of the program cycle, the transmission of the input data of the sensors 220 or, respectively, of the actuators 210 to the PLC 100 via the field bus. The output data generated within the PLC 100 in the program cycle are further transmitted to the actuators 210 via the field bus in the Fieldbus cycle, so that the actuators 210 may operate according to the received output data.

The subtasks in the programs that require parallelization and are processed by a plurality of processor cores may each be assigned to at least one parallel processing section in the program of the first main processor core 111 and in the program of the second main processor core 112, respectively. The parallel processing sections in the corresponding programs of the first main processor core 111 and the second main processor core 112 may be assigned a priority having a predetermined first priority level and a predetermined second priority level, the first priority level and the second priority level being organized by a priority manager 350 of a control device 120. The priority manager 350 is primarily for managing the first priority level and the second priority level in the data structure and for making adjustments to the value of the respective priority level of the associated parallel processing section of the program. The data structure may furthermore include methods that may be retrieved by the programs on the two main processor cores 111, 112 and the two parallel processor cores 113, 114. If, for example, the first main processor core 111 arrives at a parallel processing section in the program, it retrieves an "add my subtasks" method from the priority manager data structure 350. In the method, the subtasks may then be placed in the data structure and the priority manager 350 may be configured to notify the first and second parallel processor cores 113, 114 of a new, higher priority level entry or a changed order of priority level entries in the data structure if the method subtasks are associated with a higher priority level, executing the method on the first main processor core 111. The two parallel processor cores then interrupt their processing of the current subtasks, organize the intermediate results, and then retrieve a "save my intermediate results" method from the priority manager 350 data structure. In this method, the priority level of the associated subtasks in the data structure may then also be adjusted as required. That is, this method is executed on the first and second parallel processor cores 113, 114, respectively.

It is generally not necessary for the priority manager 350 to inform the first and second main processor cores 111, 112 or the program to be executed on the two main processor cores 111, 112 of a change in the value of the at least one priority level. This is because the first and second main processor cores 111, 112 always execute the subtasks associated with it, even if they are not at the first position in the data structure of the entries of the priority levels associated with the subtasks. That is, the two main processor cores 111, 112 process the subtasks associated with them independently of the support provided by the two parallel processor cores 113, 114. In contrast, the purely sequential processing of the subtasks on the first and second main processor cores 111, 112 represents a difference for the first and second parallel processor cores 113, 114. This is because if the first and second parallel processor cores 113, 114 retrieve a "give me a new subtask" method from the data structure of the priority manager 350 and only subtasks associated with the minimum value of the priority level of the parallel processing sections of the programs are still available and are consequently intended for purely sequential processing on the first and second main processor cores 111, 112, the two parallel processor cores 113, 114 receive "there are no subtasks available" as a response. For simplicity, the individual methods of the data structure of the priority manager 350 are not further described in the following. Nevertheless, the above-mentioned methods as well as further methods of the data structure may be used for implementing the proposed method in the following figures.

The priority manager 350 may be implemented distributed on a plurality of programs in the form of a plurality of modules (e.g. software modules). It is also conceivable to implement the priority manager 350 as a stand-alone module (e.g. as a software module) in a program that may be accessed by the first parallel processor core 113 and the second parallel processor core 114 to support the first main processor core 111 and the second main processor core 112 in processing the subtasks. In addition, it is conceivable to realize the priority manager 350 as a stand-alone program or as one or more external hardware modules.

A first work package and a second work package are additionally created in the parallel processing sections in the programs of the first main processor core 111 and the second main processor core 112. The first work package comprises a first set of subtasks and the second work package comprises a second set of subtasks. The first set of subtasks and the second set of subtasks may be processed by the first main processor core 111 and the second main processor core 112, and the first parallel processor core 113 and the second parallel processor core 114, respectively, according to the first and second priority levels of the associated parallel processing section.

It is possible for a program to comprise a plurality of sequential processing sections as well as a plurality of parallel processing sections, wherein the sequential processing sections of the programs, in contrast to the parallel processing sections, do not have to be divided up into work packages with subtasks and managed by the priority manager. This is because the sequential processing sections of the programs—with tasks that do not require parallelization—may be executed on the corresponding main processor core 111, 112 without the support from the first and second parallel processor cores 113, 114. The sequential and parallel processing sections of a program may occur alternately. In addition, programs may be executed only in a purely sequential manner. The sequential processing sections or, respectively, the programs to be executed sequentially may have a sequential priority level that applies to the sequential processing section or the entire program of the control task. Furthermore, the sequential priority level is independent of whether or not the programs of the control task have a parallel processing section. The tasks may then be processed purely sequentially in the sequential processing section of the program or the program to be executed sequentially of the corresponding main processor core 111, 112.

In this context, it is conceivable that a plurality of programs of the control task may be executed on a single main processor core 111, 112, the sequential priority level being relevant in this respect. The sequential priority level of the programs may differ from the priority level of the parallel processing sections associated with the respective programs. For example, it is possible as a result that subtasks of a work package of the parallel processing section of a corresponding program are executed on the parallel processor cores 113, 114 and at the same time tasks which do not require parallelization may be processed sequentially by the one main processor core 111, 112. If the sequential processing of the tasks without parallelization is interrupted by a higher-priority sequentially executable program (having tasks without parallelization) or a sequential processing section of a program (having tasks without parallelization) on the one main processor core 111, 112, the parallel processing of the subtasks of the corresponding work package on the first and second parallel processor cores 113, 114 may continue to take place without interruption, since the parallel processing sections in the corresponding programs may be assigned a priority level separate from the sequential priority level.

Consequently, an interruption of the current subtasks by other higher-priority subtasks may occur not only in the case of parallel processing of the subtasks on the parallel processor cores 113, 114, but also in the case of sequential processing of the tasks without parallelization on the one main processor core 111, 112. The value of the priority level of the parallel processing section of the respective program of the control task may in the described embodiment also be adjusted with a single main processor core 111, 112 by the priority manager 350 during the program cycle or for a new program cycle.

Figure 2:
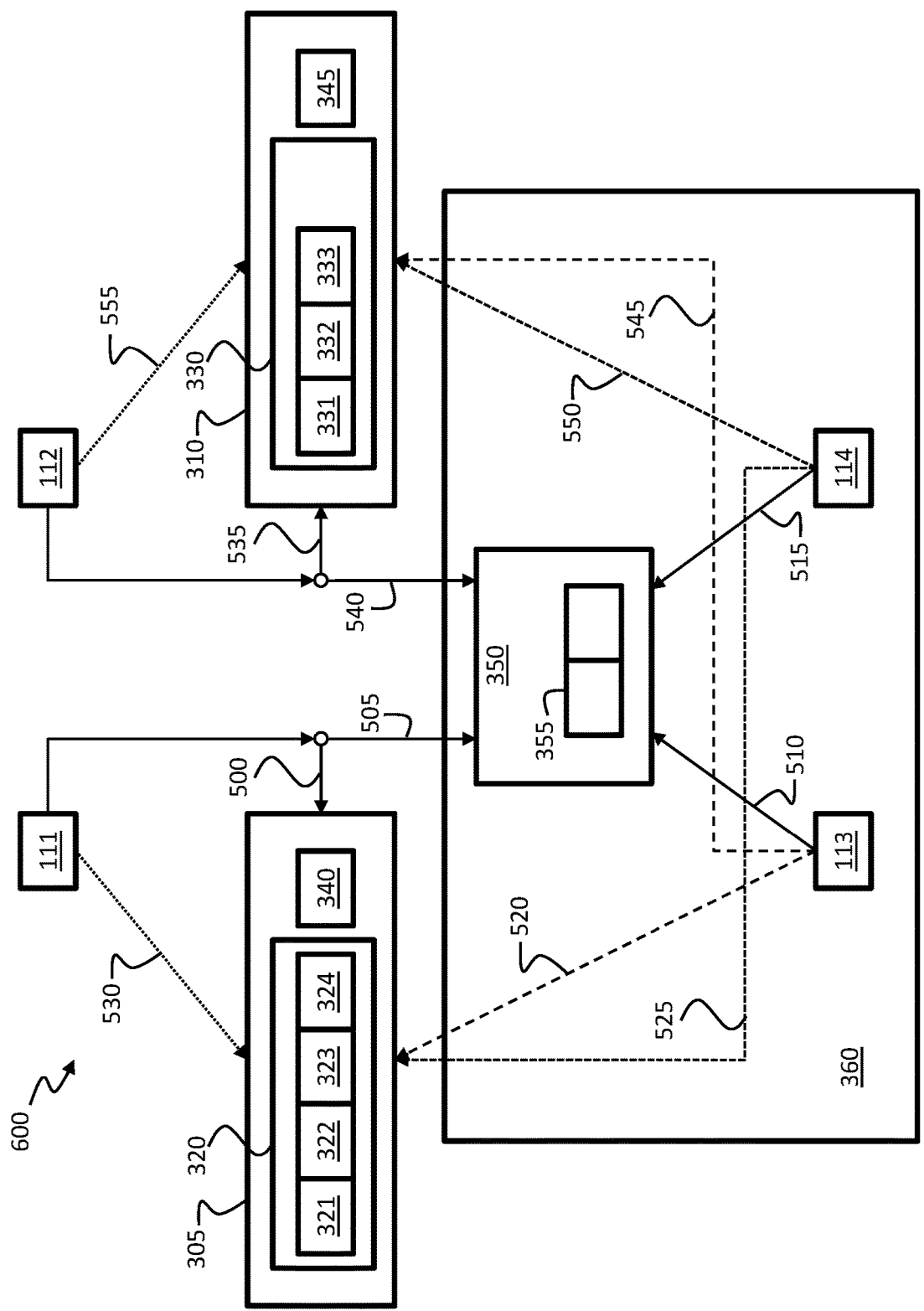
FIG. 2 a schematic depiction for creating work packages with subtasks and managing priority levels within the PLC according to FIG. 1.

FIG. 2 illustrates a schematic depiction 600 for generating work packages comprising subtasks and managing priority levels within the PLC of FIG. 1. The plurality of executable programs of the control task of the PLC may e.g. be executed on the first and second main processor cores 111, 112, wherein at least two programs of the control task each having the at least one parallel processing section. The arrow with the reference numeral 500 represents the generating of the first work package 305 at the beginning of the parallel processing section of the first main processor core 111. The first work package 305 comprises the first set of subtasks 320, which in the illustrated example comprises a first subtask 321, a second subtask 322, a third subtask 323, and a fourth subtask 324. The first work package 305 further comprises the reference to the first priority level 340 of the parallel processing section of the first main processor core 111. The forwarding of the reference to the first priority level 340 of the parallel processing section of the first main processor core 111 to the priority manager 350 is illustrated by the arrow with reference numeral 505. The priority manager 350 inserts the first priority level 340 into a data structure 355 and stores the data structure 355 in the data structure memory of the control device. If the data structure 355 has no entries, the priority manager 350 inserts the reference to the first priority level 340 into the first position of the entries of the priority levels in the data structure 355.

The arrows with reference numerals 510, 515 indicate the request of the first and second parallel processor cores 113, 114 to the priority manager 350, which priority level entry is at the first position of the entries in the data structure 355. For example, the first priority level entry in the data structure 355 may be the reference to the first priority level 340 of the first main processor core 111. As the first priority level 340 refers to the parallel processing section of the first main processor core 111, the first parallel processor core 113 and the second parallel processor core 114 access the corresponding first work package 305. The access of the first and second parallel processor cores 113, 114 to the first work package 305 is indicated by the arrows with reference numerals 520, 525.

For example, the first parallel processor core 113 may request the first work package 305 to determine if there is a free first to fourth subtask 321-324 that has not yet been distributed elsewhere. The request from the first parallel processor core 113 is indicated using the arrow with the reference numeral 520. For example, this may be the first subtask 321 that the first parallel processor core 113 is assigned to process. The first subtask 321 is then no longer available for distribution for the time being in order to be able to avoid multiple allocation of the same subtask. The second parallel processor core 114 may e.g. be assigned the second subtask 322 in this way. The parallel execution of the first and second subtasks 321, 322 by the first and second parallel processor cores 113, 114 is indicated by the reference numeral 360 and the box around the first and second parallel processor cores 113, 114. The first main processor core 111 may also sequentially process subtasks during the parallel processing portion in the program, accordingly, it also requests a free first to fourth subtask 321-324 for processing from the first work package 305. The request by the first main processor core 111 is represented by the arrow with reference numeral 530. For example, the third subtask 323 may be assigned to it.

Once the first main processor core 111 or either of the two parallel processor cores 113, 114 have fully processed their first to third subtasks 321-323, the remaining fourth subtask 324 may be allocated as described above. An embodiment example has been provided for allocating the first to fourth subtasks 321-324 to the first main processor core 111 and the first and second parallel processor cores 113, 114. It is also conceivable to otherwise distribute the first through fourth subtasks 321-324 among the first main processor core 111 and the first and second parallel processor cores 113, 114.

When the second main processor core 112 reaches its parallel processing section in its program, it generates the second work package 310 with the second set of subtasks 330, which in the example shown consists of a fifth subtask 331, a sixth subtask 332 and a seventh subtask 333. Generating the second work package 310 by the second main processor core 112 is visualized by the arrow having reference numeral 535. Furthermore, the second work package 310 comprises the reference to the second priority level 345 of the parallel processing section in the program of the second main processor core 112. The reference to the second priority level 345 is further forwarded by the second main processor core 112 to the priority manager 350. The forwarding of the reference to the second priority level is visualized using the arrow with the reference sign 540. The priority manager 350 places the reference to the second priority level 345 at the second location of the entries of the priority levels in the data structure 355 or at the first location of the entries of the priority levels in the data structure 355, according to its value. If another entry was previously at the first position of the entries of the priority levels in the data structure 355, then, in the event that the first priority level 340 is lower than the second priority level 345 of the new entry, the priority manager 350 places this entry at the second position of the entries of the priority levels in the data structure 355 and stores the entries of the data structure 355 in the data structure memory.

If the order of entries of the priority levels in the data structure 355 changes, the priority manager 350 informs the first and second parallel processor cores 113, 114 accordingly. The operation is accompanied by the interruption of the first, second, and possibly fourth subtasks 321, 322, 324 currently being processed by the first parallel processor core 113 and/or the second parallel processor core 114 from the first set of subtasks 320. The intermediate results of the calculations may be transferred to the control device 120 shown in FIG. 1 and saved to an intermediate results memory. The intermediate result memory may be accessed by the first and second main processor cores 111, 112 as well as by the first and second parallel processor cores 113, 114 if the processing of the interrupted first, second and possibly fourth subtasks 321, 322, 324 is to be continued on the parallel processor cores 113, 114.

While the first main processor core 111 continues to sequentially process the third subtask 323 from the first set of subtasks 320 of the first work package 305, the first parallel processor core 113 and the second parallel processor core 114 as well as the second main processor core 112 request the fifth to seventh subtasks 331-333 from the second set of subtasks 330 from the second work package 310. The requests of the respective processor cores are illustrated by the three arrows having reference numerals 545, 550, 555. For example, the fifth subtask 331 may be assigned to the first parallel processor core 113 and the seventh subtask 333 may be assigned to the second parallel processor core 114. Meanwhile, the sixth subtask 332 may be sequentially processed by the second main processor core 112. For distributing the fifth to seventh subtasks 331-333 to the first and second parallel processor cores 113, 114 and the second main processor core 112, a distribution of the fifth to seventh subtasks 331-333 differing from the example shown is conceivable, as well.

The two parallel processor cores 113, 114 do not necessarily have to wait until all fifth to seventh subtasks 331-333 from the higher-priority second work package 310 of the parallel processing section of the program of the second main processor core 112 have been completely processed. For example, if the first parallel processor core 113 has already completely processed its fifth subtask 331 while the second parallel processor core 114 is still busy processing the seventh subtask 333 and the second main processor core 112 is busy processing the sixth subtask 332 of the second work package 310, the first parallel processor core 113 may already start processing one of the previously interrupted first to fourth subtasks 321-324 of the first work package 305, which are associated with a lower priority level. This is possible if the first parallel processor core 113 requests a free subtask from the second work package 310 after processing its fifth subtask 331, but there is currently no free subtask left in the first position of the second work package, wherein the two work packages 305, 310 may also be part of the data structure 355. Then, the first parallel processor core 113 may start processing one of the first to fourth subtasks 321-324 from the first work package 305 so that the computing power of the first parallel processor core 113 may be optimally utilized. This means that unnecessary waiting time for the two parallel processor cores 113, 114 to begin processing the first through seventh subtasks 321-324, 331-333 may be avoided.

When the processing of the first and second subtasks 321, 322 of the first work package 305 is resumed by the first and second parallel processor cores 113, 114, the distribution of the first and second subtasks 321, 322 from the first work package 305 to the first and second parallel processor cores 113, 114 may e.g. be performed analogously to the described embodiment example, i.e. the first parallel processor core 113 is assigned the first subtask 321 and the second parallel processor core 114 is assigned the second subtask 322 from the first work package 305. The two parallel processor cores 113, 114 access the intermediate result memory in order to be able to use the intermediate results of the first and second subtasks 321, 322 for further processing of said subtasks.

When the fifth, sixth, and seventh subtasks 331, 332, 333 are entirely completed by the processor cores described above from the second set of subtasks 330, the corresponding second work package 310 reports this to the priority manager 350 so that the priority manager 350 removes the corresponding reference to the second priority level 345 from the priority level entries in the data structure 355.

Since the first main processor core 111 has continued to process the third subtask 323 of the first work package 305 while the first parallel processor core 113 has processed the fifth subtask 331 and the second parallel processor core 114 has processed the seventh subtask 333 from the second work package 310, it is possible that during the time that the parallel processor cores 113, 114 completely process their assigned fifth and seventh subtasks 331, 333, the first main processor core 111, too, completes the processing of the third subtask 323. Thereafter, the first main processor core 111 may request the remaining fourth subtask 324 from the first work package 305 and process it, while the parallel processor cores 113, 114 resume processing the first and second subtasks 321, 322. The request of the first main processor core 111 at the first work package 305 is indicated by the arrow with reference numeral 530.

When the first, second and fourth subtasks 321, 322, 324 have been fully processed by the first and second parallel processor cores 113, 114 and by the first main processor core 111, and furthermore when the third subtask 323 has been completed by the first main processor core 111, the associated first work package 305 reports completion of the first to fourth subtasks 321-324 to the priority manager 350 so that the priority manager 350 removes the reference to the first priority level 340 from the priority level entries in the data structure 355. It is further conceivable that the priority manager 350 itself inquires of the first and second work packages 305, 310 whether first through seventh subtasks 321-324, 331-333 from the first and second sets of subtasks 320, 330 are still available for completion and then, as the case may be, removes the corresponding reference to the first and second priority levels 340, 345 from the data structure 355 in the data structure memory.

As soon as the first and second main processor cores 111, 112 in the parallel processing section request a further first to seventh subtask 321-324, 331-333 from their respective work package 305, 310, but unprocessed first to seventh subtasks 321-324, 331-333 are no longer available, the first and second main processor cores 111, 112 wait until the parallel processor cores 113, 114 have finished processing the currently still executed first to seventh subtasks 321-324, 331-333. Then, the corresponding parallel processing section of the first and second main processor cores 111, 112 is exited and the first and second work packages 305, 310 are deleted. Thereafter, the first and second main processor cores 111, 112 may perform any further (non-parallelized) calculations, e.g. building on the results of the previous parallel processing section.

By distributing individual first to seventh subtasks 321-324, 331-333 among the first and second main processor cores 111, 112 and among the first and second parallel processor cores 113, 114, the total processing time of the first to seventh subtasks 321-324, 331-333 may be reduced and computing capacity may be optimally utilized. Furthermore, deadlines of the programs can be met and real-time capability of the control task can be ensured by taking into account the first and second priority levels 340, 345 of the respective parallel processing sections of the programs of the first and second main processor cores 111, 112. This is because with the first and second priority levels 340, 345, the processing of the first to fourth subtasks 321-324 from the first set of subtasks 320 can be interrupted in favor of other fifth to seventh subtasks 331-333 from the second set of subtasks 330, if these are assigned a higher second priority level 345. It is equally conceivable that processing of fifth to seventh subtasks 331-333 from the second set of subtasks having a second priority level 345 is interrupted due to the higher-prioritized first set of subtasks 320 comprising first to fourth subtasks 321-324 and the first priority level. Interrupted first to seventh subtasks 321-324, 331-333 from the first and second sets of subtasks 320, 330 may continue to be processed. This is because the reference to the first and second priority level entries 340, 345 is retained in the data structure 355 in the data structure memory as long as the corresponding first to seventh subtasks 321-324, 331-333 from the first and second sets of subtasks 320, 330 of the first and second work packages 305, 310 have not been fully processed.

In one embodiment, the first and second work packages 305, 310 comprising the first and second sets of subtasks 320, 330, and the reference to the first and second priority levels 340, 345 are generated by the first and second main processor cores 111, 112 at the beginning of the execution of the respective program. Likewise, it is conceivable that a new work package is generated at the beginning of a further parallel processing section in the program of the first main processor core 111 and/or the second main processor core 112, respectively.

However, when the execution of the first to seventh subtasks 321-324, 331-333 in the parallel processing section of the respective program is interrupted, it is usually not possible to determine which data are relevant for a continuation of said subtasks in the respective program after the interruption, since the first to seventh subtasks 321-324, 331-333 may be interrupted at any point in the corresponding program during the execution time of the program. In this respect, this embodiment may require the backup of all data generated or processed during the execution of the first to seventh subtasks 321-324, 331-333 in the parallel processing section in the corresponding program if no corresponding interruption point has been set in the first to seventh subtasks 321-324, 331-333 up to which the execution of the first through seventh subtasks 321-324, 331-333 is continued and then interrupted. This is because with the predetermined interruption point, which may e.g. be set in a control structure in the first to seventh subtasks 321-324, 331-333, it is known which data are required to continue the interrupted first to seventh subtasks 321-324, 331-333. In the case of the set interruption point, it is not necessary to save all data, but it is sufficient to save the current iteration of the control structure, which may be a loop, and any existing intermediate results of the calculations.

A further embodiment provides that the processing of the first to seventh subtasks 321-324, 331-333 in the parallel processing section of the respective program on the first and second parallel processor cores 113, 114 is immediately aborted and no intermediate results of the calculations are saved in the process. Consequently, an aborted first to seventh subtask 321-324, 331-333 may need to be recomputed from the beginning. The immediate abort of the currently executed first to seventh subtasks 321-324, 331-333 on the two parallel processor cores 113, 114 without saving the data may e.g. be applied if the first or second main processor core 111, 112 have a parallel processing section with a very small program cycle time and the parallelization is required in order to be able to meet the deadlines. Advantageously, with this embodiment, the lowest possible latency may be achieved, the latency indicating the time between the termination of the computations of the current first through fourth subtasks 321-324 (fifth through seventh subtasks 331-333) on the parallel processor cores 113, 114 and the start of the computations of the new fifth through seventh subtasks 331-333 (first through fourth subtasks 321-324) on the parallel processor cores 113, 114 associated with a higher priority level. Such an embodiment sets the goal of achieving the lowest possible latency, therefore intermediate results of the first to seventh subtasks 321-324, 331-333 may be discarded with a low priority level.

Instead of interrupting the currently executed first to fourth subtasks 321-324, it is further conceivable to process the first to fourth subtasks 321-324 to the end and to sort a new fifth to seventh subtask 331-333 with a higher priority level of the respective parallel processing section, suitably into the data structure 355 of the priority manager 350, but without interrupting the processing of the current first to fourth subtasks 321-324 in the process. In this way, the parallel processor cores 113, 114 are not forced to immediately abort their computations or to interrupt them if the new fifth to seventh subtasks 331-333 are assigned a higher priority than the current first to fourth subtask 321-324. This is because once the two parallel processor cores 113, 114 have completed processing their current lower priority first to fourth subtasks 321-324, they are assigned one of the new higher-priority fifth to seventh subtasks 331-333 when the next subtask is requested via the conventional path. For example, the embodiment may be used when the first to seventh subtasks 321-324, 331-333 in the first work package 305 and the second work package 310 are relatively small and, accordingly, processing by the processor cores may be carried out promptly. The advantage of this embodiment is that the computational throughput is highest on the two parallel processor cores 113, 114 without aborting or interrupting the first to seventh subtasks 321-324, 331-333.

The embodiment in which the currently processed first to seventh subtasks 321-324, 331-333 are interrupted and their intermediate results are saved on the intermediate result memory may be to a good compromise between latency and computing throughput. It is possible to combine the various embodiments of interruption, immediate termination or appropriate sorting of the first to seventh subtasks described above and implement them appropriately depending on the situation.

In one embodiment, the priority manager 350 may actively notify the first and second parallel processor cores 113, 114 of the change in the first entry of the first or second priority level 340, 345 in the data structure 355. This allows the first and second parallel processor cores 113, 114 to each directly request a free first to seventh subtask 321-324, 331-333 from the corresponding first or second work package 305, 310 and to begin processing them at an early stage. The requests of the respective parallel processor cores 113, 114 are shown by reference numerals 520, 525, 545, 550. Also, the priority manager 350 may be configured such that the first and second parallel processor cores 113, 114 themselves actively request the priority manager 350 whether there is a change in the order of the entries of the first and second priority levels 340, 345. The request of the first and second parallel processor cores 113, 114 is indicated by the two arrows with the reference numerals 510, 515.

It is furthermore conceivable that the requests of the first and second main processor cores 111, 112 and the first and second parallel processor cores 113, 114 to the first or second work package 305, 310 are controlled by a central device. The requests of the respective processor cores are shown by arrows with reference numerals 520, 525, 530, 545, 550, 555. The central facility may further control the task distribution of the first to seventh subtasks 321-324, 331-333 from the first and second sets of subtasks 320, 330 of the first and second work packages 305, 310. Further, the central unit may ensure that notification of completion of all first to seventh subtasks 321-324, 331-333 from the first and second sets of subtasks 320, 330 of the first and second work packages 305, 310 is directed to the priority manager 350.

If the first and second priority levels 340, 345 of the corresponding parallel processing sections in the programs of the first and second main processor cores 111, 112 have the same value, the first and second main processor cores 111, 112 may share the first and second parallel processor cores 113, 114 for parallel execution 360 of the first to seventh subtasks 321-324, 331-333.

The previous description referred to the fact that the value of the at least one priority level of the parallel processing section of the corresponding program remains unchanged during a program cycle in order to simplify the explanation of the generation of the work packages and the access to the work packages as well as the management of the priority levels of the parallel processing sections of the programs. The value of the at least one priority level of the respective parallel processing sections of the programs of the control task may be adjusted by the priority manager for the embodiments shown in FIGS. 1 and 2 in the same way as described in the following figures, in the case of interruption of the parallel processing section of the programs. In order to increase the computational throughput of the control task, it is further possible when evaluating the computational throughput for FIGS. 1 and 2 (as well as the following figures) to take into account the computational time of the respective parallel processing section of the programs of the control task and to process subtasks of the corresponding programs, which do not require mandatory parallel execution, purely sequentially on the associated main processor core. Furthermore, it is convenient to take the computing power of the two parallel processor cores into account when evaluating the computing throughput of the control task, and to assign them subtasks for parallel processing in the event that their computing power is not fully utilized. For this purpose, it may be necessary for the priority manager to suitably adjust the value of at least one priority level of the parallel processing sections of the programs.

Figure 3:
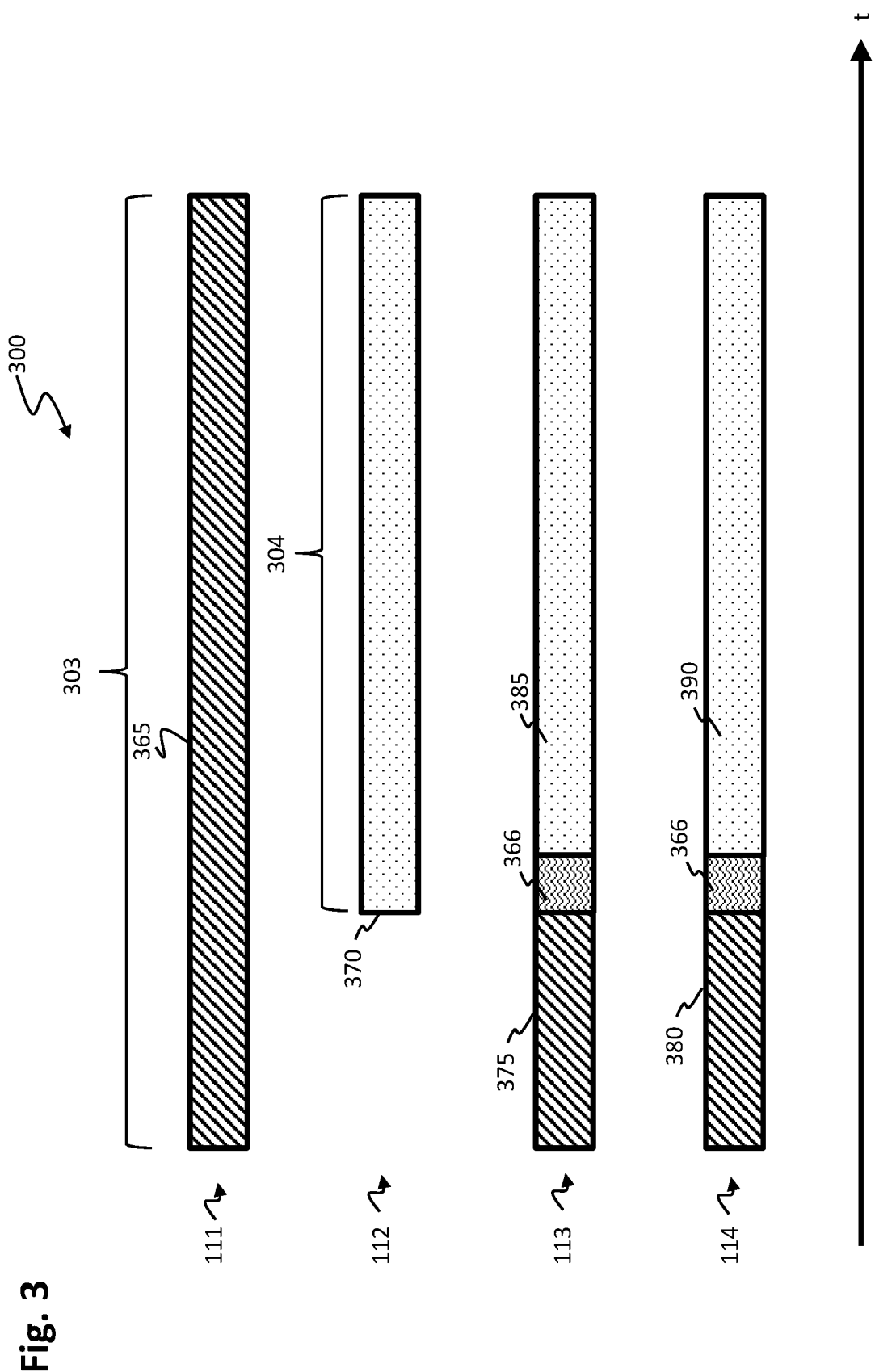
FIG. 3 a schematic depiction of a method for optimizing data processing on the PLC according to FIGS. 1 and 2.

FIG. 3 shows a schematic depiction of a method 300 for data processing on the PLC according to FIGS. 1 and 2. As shown in FIGS. 1 and 2, the first and second main processor cores 111, 112 and the first and second parallel processor cores 113, 114 serve as a starting point. However, a different number of main and/or parallel processor cores is conceivable, as well. However, at least one parallel processor core is necessary for a parallel execution 375, 380, 385, 390 of the subtasks of the respective parallel processing sections 303, 304 of the programs of the control task. If a different number of main processor cores than those shown in FIGS. 1 to 3 is used, the number of work packages and the number of subtasks may consequently differ. In the embodiment example shown in FIG. 3, the first main processor core 111 in the program first arrives at its parallel processing section 303. The parallel processing section is indicated by the uppermost striped horizontal bar and the curly bracket with the reference numeral 303. At the beginning of its parallel processing section 303, the first main processor core 111 generates the first work package comprising the first to fourth subtasks and referencing the first priority level of the associated parallel processing section 303, as described above. At this point, the allocation of the respective subtasks is not described in detail, since it may be performed in the same manner as already described in FIG. 2.

The first to fourth subtasks may be executed sequentially in the parallel processing section 303 of the corresponding program on the first main processor core 111, which is illustrated by the reference numeral 365. In the parallel processing section 303 of the first main processor core 111, the first to fourth subtasks may also be executed in parallel by the first and second parallel processor cores 113, 114 in addition to the sequential execution 365. The parallel execution of the first to fourth subtasks is shown by the two lower striped bars with reference numeral 375 and 380. At first, only the first to fourth subtasks of the first work package of the parallel processing section 303 of the first main processor core 111 are available, which may therefore be processed without competition and without prior interruption by the first and second parallel processor cores 113, 114.

However, when the second main processor core 112 reaches its parallel processing section 304 in the program, the computations of the first to fourth subtasks actively processed previously on the first and second parallel processor cores 113, 114 are interrupted. The interruption of the processing of the first to fourth subtasks of the parallel processing section 303 of the program executed on the first main processor core 111 is shown by reference numeral 366. The interruption of the execution of the first to fourth subtasks of the parallel processing section 303 of the corresponding program may be performed according to any of the possibilities explained in connection with FIG. 2. As the case may be, determined intermediate results of the calculations may be transferred to the intermediate results memory and saved there. This administrative overhead results in the first and second parallel processor cores 113, 114 not being able to immediately start processing the subtasks of the parallel processing section 304 of the corresponding program executed on the first main processor core 111 after the time of interruption of the processing of the first to fourth subtasks of the parallel processing section 303 of the program executed on the second main processor core 112. Due to the administrative overhead, processing of the subtasks of the parallel processing section 304 of the program executed on the second main processor core 112 can only occur after a corresponding time delay.

At the beginning of its parallel processing section 304 in the corresponding program, the second main processor core 112 generates the second work package 310 with the fifth to seventh subtask and the reference to the priority level of the associated parallel processing section 304. The fifth to seventh subtasks may be executed sequentially in the parallel processing section 304 of the corresponding program on the second main processor core 112, which is illustrated by reference sign 370. In the parallel processing section 304 of the second main processor core 112, the fifth to seventh subtasks may also be executed in parallel by the first and second parallel processor cores 113, 114 in addition to sequential execution 370. The parallel execution of the fifth to seventh subtasks is shown via the two lower dotted bars with reference numerals 385, 390. In FIG. 3, it was assumed that the value of the second priority level of the parallel processing section 304 of the corresponding program executed on the second main processor core 112 is higher than the value of the first priority level of the corresponding parallel processing section 303 of the other program executed on the first main processor core 111. This assumption results in the execution of the first to fourth subtasks of the parallel processing section 303 of the corresponding program on the first and second parallel processor cores 113, 114 being interrupted.

If the illustrated embodiment example in FIG. 3 is extended to further main and parallel processor cores, it is obvious that the number of interruptions in the processing of the corresponding subtasks of the corresponding parallel processing sections of the programs on the parallel processor cores may increase. On the other hand, if the subtasks of the respective parallel processing sections 303, 304 of the programs require non-mandatory parallel execution 375, 380, 385, 390 on the first and second parallel processor cores 113, 114, the value of the priority level associated with the respective parallel processing section 303, 304 may be dynamically adjusted during the program cycle. In this specific example, the value of the second priority level may be reduced by a factor or immediately set to a minimum value by the priority manager so that the fifth to seventh subtasks of the parallel processing section 304 of the corresponding program may directly be processed sequentially by the second main processor core 112 without interrupting the processing of the first to fourth subtasks 321-324 on the two parallel processor cores 113, 114. The advantage of reducing the value of the priority level of the parallel processing section 304 of the program executed on the second main processor core 112 is that the interruption of the processing of the first to fourth subtasks of the parallel processing section 303 of the associated program executed on the first main processor core 111 may thereby be prevented. Thus, it is possible to minimize the management overhead, wherein the dynamic adjustment of the value of the priority level of the parallel processing section of the programs is performed by the priority manager if the computational throughput of the control task can be increased in this way. The increase in the computational throughput of the control task may have a particularly positive effect on programs with a high value of the priority level of the parallel processing section 303, 304 of the program and may e.g. allow for shorter deadlines. In this way, it may be possible to increase the working speed of the machine or system of the automation system.

Furthermore, the priority manager may be used to ensure the real-time capability of the automation system, since the priority manager adjusts the values of the priority levels of the respective parallel processing sections 303 of the corresponding programs in such a way that the deadlines of the programs are met in any case. The value of the at least one priority level may be reduced as desired. For example, the value of the priority level may remain unchanged by the priority manager during the first interruption of the respective parallel processing section 303, 304 of the program. After the second interruption of the respective parallel processing section 303, 304 of the program, the priority manager may reduce the value of the priority level of the associated parallel processing section 303, 304 by a factor. In this context, the value of the priority level of the corresponding parallel processing section 303, 304 of the program may e.g. be reduced to a greater extent the more frequently the respective parallel processing section 303, 304 with the contained subtasks of the program is interrupted.

The priority manager may adjust the value of the priority level of the parallel processing section 303, 304 when the subtasks are interrupted due to other subtasks of another program having a higher priority level on the two parallel processor cores 113, 114. The priority manager may adjust the value of the priority level of the parallel processing section 303, 304 of the corresponding program for the interrupted subtasks on the two parallel processor cores 133, 114 in order to prevent further interruption of the subtasks on the two parallel processor cores 113, 114 and, in this context, to provide for the least possible administrative overhead for the outstanding subtasks in the respective work package.

Further, the priority manager may also adjust the value of the priority level of the parallel processing sections 303, 304 of the programs that is responsible for interrupting the processing of the subtasks of the parallel processing sections of the programs. Alternatively, the priority manager may adjust the value of the priority level of the parallel processing sections 303, 304 of the respective programs if the respective priority level is located as an entry in the data structure in the data structure memory and no subtasks from the associated parallel processing section 303, 304 are currently being actively processed by the two main and parallel processor cores 111-114. Further, the priority manager may adjust the value of the priority level of the parallel processing sections 303, 304 of the corresponding programs when subtasks in the respective parallel processing section 303, 304 of the program are actively being processed by the processor cores and free, unprocessed subtasks exist in the associated work package. In this case, the adjustment of the value of the priority level of the parallel processing section 303, 304 affects the free subtasks of the work package.

An advantage of adjusting the value of the priority level of the parallel processing sections 303, 304 of the respective programs is that it may be done temporarily. The dynamic adaptation of the value of the at least one priority level does not have to be carried out in the same way for the entire program cycle. For example, the value of the priority level may be reset to the predetermined value for a new program cycle and changed again for another program cycle. Within the program cycle, as well, the value of the at least one priority level of the parallel processing sections of the programs may be adjusted by the priority manager as often as desired. In this context, it is further possible to increase the value of the at least one priority level of the parallel processing sections 303, 304 of the respective programs for the next program cycle if the subtasks in the preceding program cycle were processed purely sequentially in the respective programs, so that the deadlines of the programs can be met or to ensure that the first to seventh subtasks of the respective parallel processing sections of the programs are executed in parallel for the respective next program cycle. At the same time, it can be ensured that the computing power of the two parallel processor cores 113, 114 is utilized in the best possible way.

Also conceivable is an embodiment in which a program that should be executed immediately (for example, due to a short program cycle time and deadline) is provided with a very high value of the priority level of the parallel processing section of the program by the priority manager, and this value of the priority level continues to be unchanged by the priority manager for the next program cycle in spite of a potential interruption of the parallel processing section 303, 304 with corresponding priority level. Also, the value of the priority level of the respective parallel processing section 303, 304 of the program with the corresponding first to seventh subtask may be increased in case of an interruption of the respective parallel processing section so that the corresponding parallel processing section 303, 304 with the respective first to seventh subtask of the program is no longer interrupted in the next program cycle.

The above-mentioned possibilities for adjusting the value of the priority level of the parallel processing section 303, 304 of the program each related to reducing the management overhead by a small number of interruptions of the parallel processing sections 303, 304 of the programs and providing the best possible capacity utilization of the computing power of the processor cores. The number of interruptions of the parallel processing sections 303, 304 and their interruption duration in time as well as the used computing power of the processor cores may be determined by the control device of the PLC if the expected computing throughput of the control device is to be evaluated. Similarly, the expected computational throughput may also be determined based on the computational time of the parallel processing sections 303, 304 of the programs of the control task. That is, subtasks of the corresponding programs that do not require mandatory parallel execution 375, 380, 385, 390 may likewise be processed purely sequentially on the associated main processor core if the sequential computing time is shorter than the computing time of the subtasks of the parallel processing section 303, 304 with possible interruptions of the parallel processing section 303, 304. For this purpose, the priority manager may reduce or minimize the value of the at least one priority level of the parallel processing sections 303, 304 of the programs so that the subtasks of the parallel processing sections 303, 304 are processed sequentially, as the case may be, if they do not necessarily have to be executed in parallel. In order to evaluate the computing throughput in the aforementioned case, the control task also checks whether the computing power of the two parallel processor cores 113, 114 continues to be used in the best possible way by sequentially processing the subtasks of the parallel processing sections 303, 304.

Figure 4:
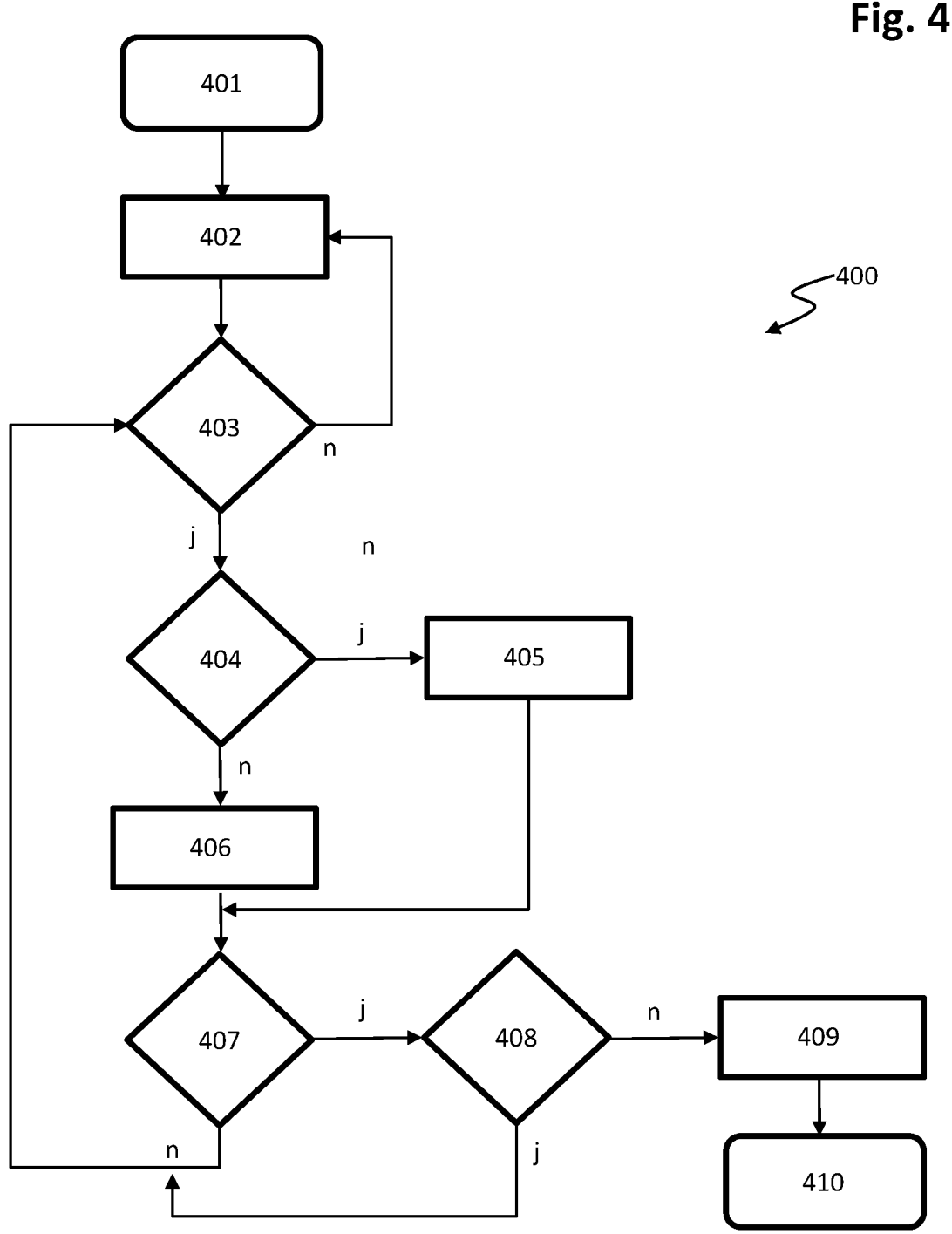
FIG. 4 a flowchart for dynamically adjusting a priority level of a parallel processing section of a program according to FIG. 3.

FIG. 4 shows a flowchart for dynamically adjusting at least one priority level of a parallel processing section of a program according to FIG. 3, wherein the adjustment of the value of the at least one priority level of the parallel processing section of the corresponding program of the control task is performed by the priority manager 350 in FIGS. 1 and 2. A first step 401 indicates the start of the dynamic adaptation of the value of the at least one priority level of the parallel processing section of the corresponding program. In a second step 402, the start values of the first to kth priority levels of the parallel processing sections of the programs are determined by the priority manager for the respective program cycle, wherein k may be a positive integer really higher than one. The values of the priority levels of the respective parallel processing sections of the programs may be integer values.

In a subsequent third step 403, a branch is used to check whether the processing of the first to fourth subtasks of the first work package in the corresponding parallel processing section (with an assigned first priority level) of the program was interrupted due to subtasks of the kth work package in the respective parallel processing section (with assigned kth priority level), wherein the value of the kth priority level is higher than the value of the first priority level. If this is not the case, a return to the second step 402, i.e. the setting of the respective start values of the priority levels of the parallel processing sections of the programs by the priority manager, takes place. If the check for interruption of the processing of the subtasks in the third step 403 yields a positive result, then in a fourth step 404 it is further checked whether the interrupted first to fourth subtasks of the first work package of the parallel processing section of the corresponding program of the control task are to be executed sequentially.

For example, for programs with very short program cycle time, the priority manager may set the value of the priority level of the parallel processing sections of the programs to the minimum value directly at the first interruption of the corresponding subtasks so that the subtasks are processed sequentially by the respective main processor core. If, on the other hand, the priority manager sets the value of any priority levels to the minimum value at the first interruption of the processing of the subtasks of the parallel processing sections of the programs, the parallel processor cores may no longer be fully utilized. This means that free computing time is available if the higher-priority parallel processing sections with subtasks have finished processing and no further higher-prioritized subtasks of another program with parallel processing section are yet available for processing on the parallel processor cores. This available time should normally be used by the two parallel processor cores for the processing of lower-priority parallel processing sections with subtasks. Only if the control unit notices during the evaluation of the computing throughput that the lower-priority parallel processing sections with subtasks of a work package have been interrupted frequently despite multiple reductions in the value of the priority level, may the priority manager be triggered to set this minimum priority level for the interrupted subtasks of the parallel processing sections.

If the first to fourth subtasks of the first work package of the parallel processing section of the program rely on parallelization to meet the deadline of the program, the priority manager accordingly adjusts the value of the first priority level (and/or the kth priority level, if applicable) of the parallel processing section of the corresponding program of the control task in a fifth step 406. The adjustment of the value of the first and/or kth priority level of the parallel processing section of the corresponding program by the priority manager may consist in decreasing or increasing the value of the priority level, analogously to the description in FIG. 3, in order to prevent further possible interruptions of the parallel processing section of the program with the first to fourth subtasks or to reduce their number, respectively, in order to minimize the administrative overhead and to increase the computational throughput of the control task.

If, on the other hand, the check in the fourth step 404 is affirmative, then in a sixth step 405 the priority manager sets the value of the first priority level of the parallel processing section of the program to a minimum value so that the subtasks of the parallel processing section of the program for the current program cycle may be directly executed in a purely sequential manner on the corresponding main processor core. The branch in the fourth step 404 leads to a seventh step 407, another branch, for the two possibilities described above. In the branch in the seventh step 407, the priority manager checks whether the parallel processing section of the respective program has ended. If this is not the case, i.e. if the processing of the first to fourth subtasks of the parallel processing section of the program is still continuing, a return to the third step 403 takes place, in which a check is carried out as to whether the first to fourth subtasks of the first work package of the parallel processing section of the program were interrupted due to subtasks of the kth work package with a higher value of the kth priority level. The subsequent steps of the branching of the third step 403 are then performed as already described.

If the check in the seventh step 407 shows that the parallel processing section has ended, the branch leads directly to an eighth step 408. In the eighth step 408, the priority manager checks whether the value of the adjusted first priority level of the parallel processing section of the program should be retained for the next program cycle. If the check of the priority manager in the eighth step 408 leads to a positive result, the value of the adjusted first priority level of the parallel processing section of the program is retained for the next program cycle and the eighth step 408 is returned to the branching of the third step 403. In the third step 403, a check is then carried out to determine whether the processing of the first to fourth subtasks of the first work package of the parallel processing section of the program was interrupted due to subtasks of the kth work package of the corresponding parallel processing section with a higher kth priority level. The subsequent checking steps may be carried out in the manner already described.

If the value of the adjusted first priority level of the parallel processing section of the program is not to be retained for the next program cycle, the priority manager resets the value of the first priority level to the predetermined value, i.e. the start value, in a ninth step 409. The dynamic adjustment of the value of the priority level of the parallel processing section of the program is completed in a tenth step 410. For example, this may be the case when the corresponding work packages have been deleted after the subtasks have been processed and the respective entries of the priority levels of the parallel processing sections have been removed from the data structure.

The individual first to tenth steps 401 through 410 may be reviewed by the priority manager and, as the case may be, the control device, as the control device continuously evaluates the expected computational throughput of the control task and, as the case may be, triggers the priority manager to adjust the value of the priority level of the parallel processing section of the respective program.

The invention has been described in detail with preferred embodiments. However, it is not limited by the disclosed examples, as other variations may be derived therefrom by those skilled in the art without departing from the scope of protection of the present invention.

TABLE 1

| List of reference numerals: 100-390 | |
|---|---|
| 100 programmable logic controller | 321 first subtask |
| 110 data processing device | 322 second subtask |
| 111 first main processor core | 323 third subtask |
| 112 second main processor core | 324 fourth subtask |
| 113 first parallel processor core | 331 fifth subtask |
| 114 second parallel processor core | 332 sixth subtask |
| 120 control device | 333 seventh subtask |

TABLE 1-continued

List of reference numerals: 100-390

| | |
|---|---|
| 130 communication interface | 340 first priority level |
| 200 machine/system | 345 second priority level |
| 210 actuators | 350 priority manager |
| 220 sensors | 355 data structure |
| 300 method for data processing on PLC | 360 parallel execution |
| 303 parallel processing section of first main processor core | 365 sequential execution of first main processor core |
| 304 parallel processing section of second main processor core | 366 interruption |
| | 370 sequential execution of second main processor core |
| 310 second work package | 375 first parallel execution of first parallel processor core |
| 320 first set of subtasks | |
| 330 second set of subtasks | 380 first parallel execution of the second parallel processor core |
| | 385 second parallel execution of the first parallel processor core |
| | 390 second parallel execution of the second parallel processor core |

TABLE 2

List of reference numerals: 400-600

| | |
|---|---|
| 400 flow chart for dynamic adjustment of a priority level | 500 first arrow |
| | 505 second arrow |
| 401 start | 510 third arrow |
| 402 start values of first to kth priority level | 515 fourth arrow |
| | 520 fifth arrow |
| 403 subtasks of first work package interrupted due to subtasks of kth work package with a higher priority level? | 525 sixth arrow |
| | 530 seventh arrow |
| | 535 eighth arrow |
| | 540 ninth arrow |
| 404 subtasks of first work package also executable sequentially? | 545 tenth arrow |
| | 550 eleventh arrow |
| 405 set respective priority level to a minimum value | 555 twelfth arrow |
| | 600 generating of work packages with subtasks and management of priority levels |
| 406 reduce or increase value of the first and/or kth priority level. | |
| 407 parallel processing section finished? | |
| 408 maintain the value of respective adjusted priority level for the next program cycle? | |
| 409 set value of the respective priority level to the corresponding start value | |
| 410 end | |

The invention claimed is:

1. A method for optimizing data processing on a programmable logic controller comprising at least one parallel processor core,
   wherein the programmable logic controller comprises at least one parallel processor core for executing a control task to generate actuator data from sensor data of a machine of an automation system,
   wherein a control task comprises a plurality of executable programs, the plurality of executable programs comprising a first program and a second program, the first program being associated with a first main processor core and being executed by the first main processor core, the second program being associated with a second main processor core and being executed by the first main processor core,
   wherein the at least two programs of the control task each comprise at least one parallel processing section with a work package, and the work package comprises a plurality of subtasks,
   wherein the parallel processing sections in the respective programs are each assigned a priority with a predetermined priority level,
   wherein the respective priority levels are each inserted into a data structure once an execution of the respective program has arrived at the parallel processing section, thereby placing the entry with the highest priority level at the first position of the entries in the data structure,
   wherein the at least one parallel processor core checks whether entries are present in the data structure and wherein, if entries are present, subtasks from the work package of the program the priority level of which is in the first position of the entries in the data structure are processed by the at least one parallel processor core,
   wherein the at least one parallel processor core interrupts an execution of subtasks of a work package of a executable program when a parallel processing section with a higher priority level is indicated in the data structure, subtasks from the work package of the executable program the higher priority level being then processed by the at least one parallel processor core,
   wherein during a program cycle an expected computational throughput of the control task is continuously evaluated, the evaluation taking into account a time interruption duration and a number of interruptions of the subtasks of the parallel processing sections of the programs, which result from the order of the entries of the priorities of the parallel processing sections in the data structure, and wherein at least one of the priority levels of the parallel processing sections of the respective programs is dynamically adjusted if the number of interruptions of the subtasks of the parallel processing sections is reduced and the computational throughput of the control task is increased thereby.

2. The method according to claim 1, wherein the adjustment of the at least one priority level of the parallel processing sections of the respective programs is performed upon an interruption of the processing of the subtasks of the program.

3. The method according to claim 2, wherein the adjustment of the at least one priority level of the parallel processing sections of the respective programs occurs when the subtasks of the program are interrupted due to other subtasks of another program having a higher priority level of the parallel processing section on the at least one parallel processor core.

4. The method according to claim 3, wherein the at least one priority level of the parallel processing sections of the respective programs is reduced by a factor when the subtasks of the program are interrupted due to other subtasks of another program with a higher priority level of the parallel processing section on the at least one parallel processor core.

5. The method according to claim 3, wherein the at least one priority level of the parallel processing sections of the respective programs is set to a minimum value when the subtasks of the programs are sequentially executable in the corresponding programs.

6. The method according to claim 5, wherein the at least one priority level of the parallel processing sections of the respective programs is increased at the beginning of a new program cycle if the subtasks were previously executed sequentially in the associated programs.

7. The method according to claim 1, wherein the at least one priority level of the parallel processing sections of the respective programs is reset to the predetermined value at the beginning of a new program cycle.

8. A programmable logic controller comprising:
a communication interface for reading in sensor data and for outputting actuator data,
a data processing device comprising at least one parallel processor core for executing a control task to generate actuator data from the sensor data,
a control device comprising a data structure memory for storing a data structure having priority levels and a priority manager for managing the priority levels in the data structure,
wherein the control device comprises an intermediate result memory on which intermediate results of calculations are saved,
where the control task includes a plurality of executable programs, the plurality of executable programs comprising a first program and a second program, the first program being associated with a first main processor core and being executed by the first main processor core, the second program being associated with a second main processor core and being executed by the first main processor core, wherein the at least two programs of the control task each have at least one parallel processing section with a work package, and the work package comprises a plurality of subtasks,
wherein the parallel processing sections in the respective programs each are assigned a priority with the predetermined priority level,
wherein the priority manager is embodied configured to insert the respective priority levels into the data structure in the data structure memory once an execution of the program has arrived at the parallel processing section, thereby placing the entry with the highest priority level at the first position of the entries in the data structure,
wherein the at least one parallel processor core is embodied configured to check the data structure in the data structure memory for entries of the priority levels and, if entries are present, to process subtasks from the work package of the corresponding program the priority level of which is at the first position of the entries in the data structure,
wherein the at least one parallel processor core interrupts an execution of subtasks of a work package of a executable program when a parallel processing section with a higher priority level is indicated in the data structure, subtasks from the work package of the executable program the higher priority level being then processed by the at least one parallel processor core,
wherein the control device is embodied configured to continuously evaluate an expected computational throughput of the control task during a program cycle, the evaluation taking into account a time interruption duration and a number of interruptions of the subtasks of the parallel processing sections of the programs, which result from the order of the entries of the priorities of the parallel processing sections in the data structure,
wherein the priority manager is embodied configured to dynamically adjust at least one of the priority levels of the parallel processing sections of the respective programs if the number of interruptions of the subtasks of the parallel processing sections is reduced and the computational throughput of the control task increases thereby.

9. The programmable logic controller according to claim 8, wherein
the priority manager is embodied configured to perform the adjustment of the at least one priority level of the parallel processing sections of the respective programs in case of an interruption of the processing of the subtasks of the program.

10. The programmable logic controller according to claim 9, wherein
the priority manager is embodied configured to perform the adjustment of the at least one priority level of the parallel processing sections of the respective programs when the subtasks are interrupted due to other subtasks of a further program having a higher priority level on the at least one parallel processor core.

11. The programmable logic controller according to claim 9, wherein the priority manager is adapted to reduce the at least one priority level of the parallel processing sections of the respective programs by a factor when the subtasks of the program are interrupted due to other subtasks of a further program with a higher priority level on the at least one parallel processor core.

12. The programmable logic controller according to claim 9, wherein
the priority manager is embodied configured to set the at least one priority level of the parallel processing sections of the respective programs to a minimum value when the subtasks of the programs are sequentially executable in the corresponding programs.

13. The programmable logic controller according to claim 8, wherein
the priority manager is embodied configured to reset the at least one priority level of the parallel processing sections of the respective programs to the predetermined value at the beginning of a new program cycle.

14. The programmable logic controller according to claim 12, wherein
the priority manager is embodied configured to increase the at least one priority level of the parallel processing sections of the respective programs at the beginning of a new program cycle if the subtasks of the programs were previously executed sequentially in the associated programs.

15. The programmable logic controller according to claim 8,
wherein the priority manager is embodied configured to modify the entry of the priority level in the data structure in the data structure memory according to the adjustment made to the at least one priority level, and
wherein the priority manager is embodied configured to inform the at least one parallel processor core of the change of the entry of the priority level in the data structure.

16. The programmable logic controller according to claim 8, wherein
the priority manager is embodied configured to be executable in a distributed manner on a plurality of programs of the control task.

17. An automation system, comprising:
a machine with at least one sensor and actuator, and
a programmable logic controller,
wherein the programmable logic controller comprises at least one parallel processor core for executing a control task to generate actuator data from sensor data of the machine,
wherein the control task includes a plurality of executable programs, the plurality of executable programs comprising a first program and a second program, the first program being associated with a first main processor core and being executed by the first main processor core, the second program being associated with a second main processor core and being executed by the first main processor core,
wherein the at least two programs of the control task each have at least one parallel processing section with a work package, and the work package comprises a plurality of subtasks,
wherein the parallel processing sections in the respective programs each are assigned a priority with the predetermined priority level,
wherein the respective priority levels are inserted into a data structure once an execution of the respective program has arrived at the parallel processing section, thereby placing the entry with the highest priority level at the first position of the entries in the data structure,
wherein the at least one parallel processor core checks whether entries are present in the data structure and wherein, if entries are present, subtasks from the work package of the program the priority level of which is in the first position of the entries in the data structure are processed by the at least one parallel processor core,
wherein the at least one parallel processor core interrupts an execution of subtasks of a work package of a executable program when a parallel processing section with a higher priority level is indicated in the data structure, subtasks from the work package of the executable program the higher priority level being then processed by the at least one parallel processor core,
wherein during a program cycle an expected computational throughput of the control task is continuously evaluated, the evaluation taking into account a time interruption duration and a number of interruptions of the subtasks of the parallel processing sections of the programs, which result from the order of the entries of the priorities of the parallel processing sections in the data structure,
wherein at least one of the priority levels of the parallel processing sections of the respective programs is dynamically adjusted if the number of interruptions of the subtasks of the parallel processing sections is reduced and the computational throughput of the control task is increased thereby.

18. The automation system according to claim 17, wherein an additional condition, including a real-time condition of the control task, is taken into account when adapting the at least one priority level of the parallel processing sections of the respective programs.

* * * * *